(12) United States Patent
Leibovici et al.

(10) Patent No.: US 11,422,390 B2
(45) Date of Patent: Aug. 23, 2022

(54) DIGITAL PROJECTOR FOR LOCAL DIMMING IN A DEVICE

(71) Applicant: Meta Platforms Technologies, LLC, Menlo Park, CA (US)

(72) Inventors: Matthieu Charles Raoul Leibovici, Seattle, WA (US); Jasmine Soria Sears, Kirkland, WA (US); Christophe Antoine Hurni, Seattle, WA (US); Nathan Matsuda, Seattle, WA (US); Guohua Wei, Redmond, WA (US); Yu Shi, Redmond, WA (US); John Goward, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 243 days.

(21) Appl. No.: 16/849,859

(22) Filed: Apr. 15, 2020

(65) Prior Publication Data

US 2021/0325696 A1   Oct. 21, 2021

(51) Int. Cl.
*G02C 7/10* (2006.01)
*G02B 5/26* (2006.01)
(Continued)

(52) U.S. Cl.
CPC .............. *G02C 7/102* (2013.01); *G02B 5/26* (2013.01); *G02B 27/0172* (2013.01); *G02B 27/4244* (2013.01); *G02B 2027/0178* (2013.01)

(58) Field of Classification Search
CPC .... G02B 2027/0178; G02B 5/26; G02B 5/20; G02B 27/0172; G02B 27/017; G02B 27/4244; G02C 7/102; G02C 7/10
(Continued)

(56) References Cited

U.S. PATENT DOCUMENTS 5,541,762 A * 7/1996 Levy ...................... B60R 1/088
359/239
6,424,448 B1 * 7/2002 Levy ......................... G02F 1/01
359/240
(Continued)

FOREIGN PATENT DOCUMENTS

KR       101373313 B1    3/2014
WO     2018119276 A1    6/2018

OTHER PUBLICATIONS

Final Office Action, U.S. Appl. No. 16/849,853, Notification dated Jun. 10, 2021, 12 pages.
(Continued)

*Primary Examiner* — William R Alexander
(74) *Attorney, Agent, or Firm* — Freestone Intellectual Property Law PLLC; Aaron J. Visbeek

(57) ABSTRACT

A device includes an optical assembly and a digital projector. The optical assembly is configured to receive visible scene light at a backside of the optical assembly and to direct the visible scene light on an optical path toward an eyeward side. The optical assembly includes a dimming layer disposed on the optical path. The dimming layer includes a photochromic material that is configured to darken in response to exposure to a range of light wavelengths. The digital projector is disposed on the eyeward side of the optical assembly and is configured to selectively emit an activation light within the range of light wavelengths to activate a darkening of a region of the dimming layer to dim the visible scene light within the region.

20 Claims, 23 Drawing Sheets

(51) Int. Cl.
  *G02B 27/01* (2006.01)
  *G02B 27/42* (2006.01)
(58) Field of Classification Search
  USPC .......................................................... 359/568
  See application file for complete search history.

(56) References Cited

U.S. PATENT DOCUMENTS

| | | | |
|---|---|---|---|
| 2007/0103758 A1* | 5/2007 | Dultz | G02B 27/281 359/237 |
| 2011/0240834 A1 | 10/2011 | Baudou et al. | |
| 2012/0050141 A1* | 3/2012 | Border | G02B 27/01 345/8 |
| 2014/0176781 A1 | 6/2014 | Zhang et al. | |
| 2015/0177864 A1* | 6/2015 | Wong | G06F 3/0488 345/174 |
| 2015/0309312 A1 | 10/2015 | Alton et al. | |
| 2017/0090194 A1 | 3/2017 | Hayes | |
| 2018/0003966 A1 | 1/2018 | Kilcher et al. | |
| 2018/0177976 A1 | 6/2018 | Burstein | |
| 2018/0188536 A1 | 7/2018 | Bell et al. | |
| 2018/0304727 A1 | 10/2018 | Choi et al. | |
| 2018/0356638 A1 | 12/2018 | Yang et al. | |
| 2019/0324274 A1 | 10/2019 | Kalinowski et al. | |
| 2020/0111258 A1 | 4/2020 | Sears | |
| 2020/0111259 A1 | 4/2020 | Sears et al. | |

OTHER PUBLICATIONS

International Searching Authority, Patent Cooperation Treaty, European Application No. PCT/US2021/023366, Notification dated May 27, 2021, 4 pages.
International Searching Authority, Patent Cooperation Treaty, Written Opinion of the International Searching Authority, European Application No. PCT/US2021/023366, Notification dated May 27, 2021, 7 pages.
Non-Final Office Action, U.S. Appl. No. 16/849,853, Notification dated Feb. 9, 2021, 16 pages.
International Searching Authority, Patent Cooperation Treaty, European Application No. PCT/US2021/024195, Notification dated Jun. 17, 2021, 4 pages.
International Searching Authority, Patent Cooperation Treaty, Written Opinion of the International Searching Authority, European Application No. PCT/US2021/024195, Notification dated Jun. 17, 2021, 10 pages.
U.S. Appl. No. 16/573,061, Nathan Matsuda.
U.S. Appl. No. 16/792,173, Jasmine Soria Sears.
U.S. Appl. No. 16/854,181, Jasmine Soria Sears.
U.S. Appl. No. 16/849,853, Matthieu Charles Raoul Leibovici.
Notice of Allowance dated Dec. 1, 2021 for U.S. Appl. No. 16/849,853, filed Apr. 15, 2020, 3 pages.
Notice of Allowance dated Sep. 24, 2021 for U.S. Appl. No. 16/849,853, filed Apr. 15, 2020, 8 pages.
Restriction Requirement dated Jan. 29, 2021 for U.S. Appl. No. 16/849,853, filed Apr. 15, 2020, 6 Pages.

* cited by examiner

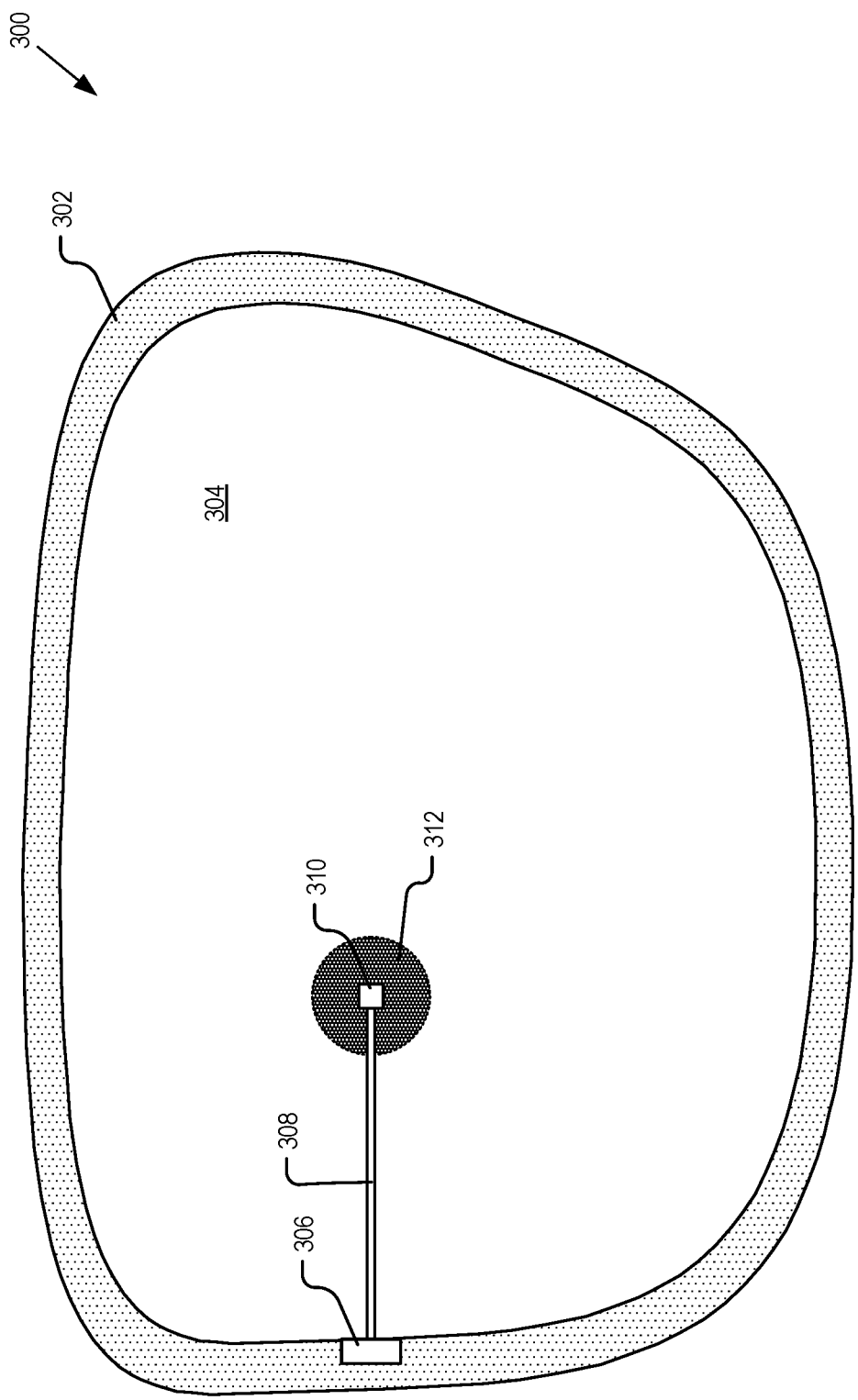

DIGITAL PROJECTOR FOR LOCAL DIMMING IN A DEVICE

FIELD OF DISCLOSURE

Aspects of the present disclosure relate generally to head mounted devices, and in particular but not exclusively, relate to the local dimming of a photochromic layer included in a head mounted device.

BACKGROUND

A smart device is an electronic device that typically communicates with other devices or networks. In some situations the smart device may be configured to operate interactively with a user. A smart device may be designed to support a variety of form factors, such as a head mounted device, a head mounted display (HMD), or a smart display, just to name a few.

Smart devices may include one or more electronic components for use in a variety of applications, such as gaming, aviation, engineering, medicine, entertainment, video/audio chat, activity tracking, and so on. In some examples, a smart device, such as a head-mounted device or HMD, may include a display that can present data, information, images, or other virtual graphics while simultaneously allowing the user to view the real world.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

FIG. 3B illustrates the portion of the head-mounted device of FIG. 3A with a darkened region of a near-eye optical assembly, in accordance with aspects of the present disclosure.

DETAILED DESCRIPTION

Various aspects and embodiments are disclosed in the following description and related drawings to show specific examples relating to the local dimming provided by a head-mounted device. Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm. Violet light may include light having a wavelength in the range of approximately 380-450 nm.

Figure 1A:
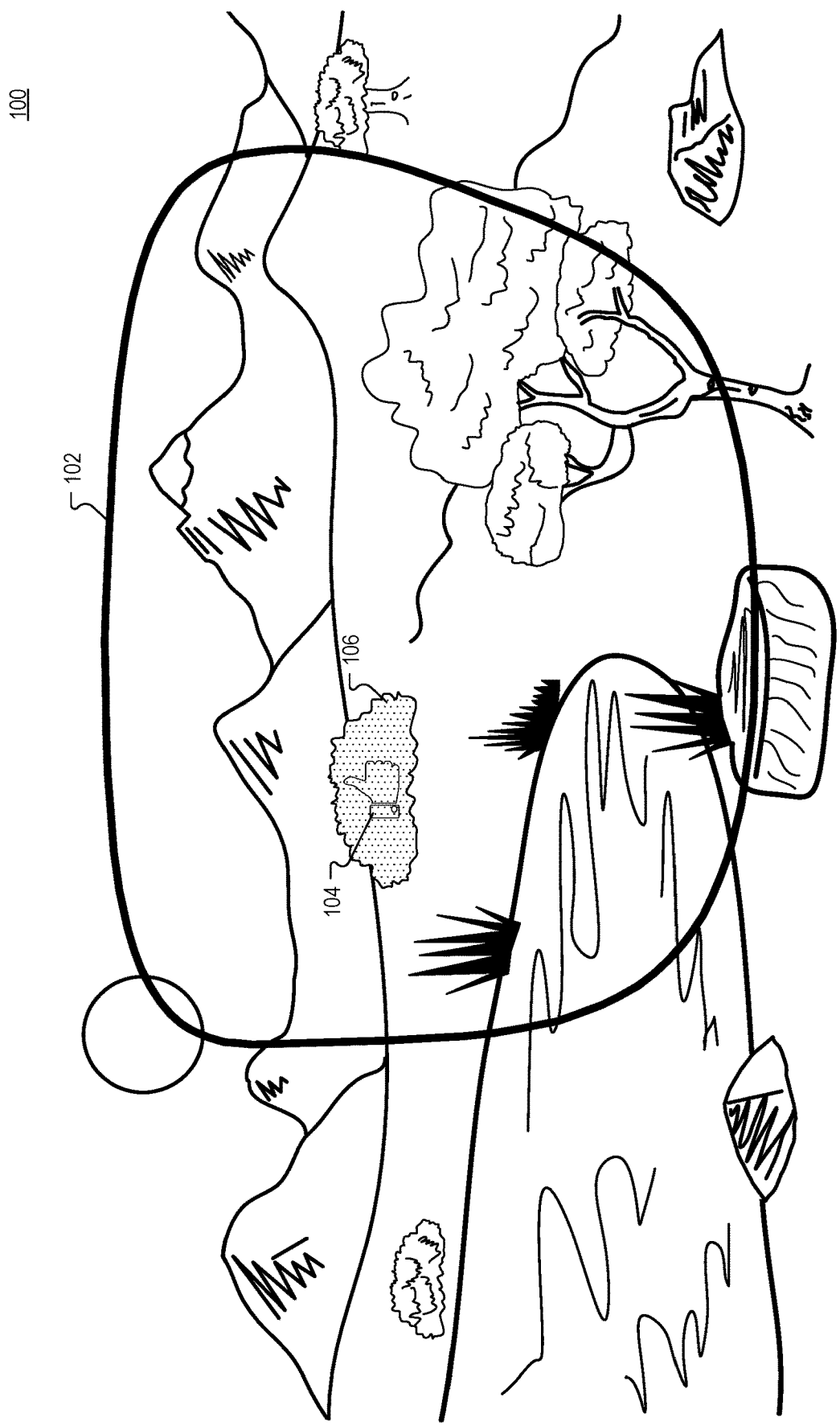
FIGS. 1A and 1B illustrate a user's view through a near-eye optical assembly of a head-mounted device.

As mentioned above, a head-mounted device may include a display that is configured to present data, information, images, or other virtual graphics while simultaneously allowing the user to view the real world. However, the virtual graphics may be difficult for the user to view if the environment is too bright, if there is insufficient contrast between the virtual graphics and the user's current view of the real world, if a color of the virtual graphic matches the color of the real world behind the virtual graphic, or some combination thereof. By way of example, FIG. 1A illustrates a user's view of a real-world scene 100 through an optical assembly 102 of a head-mounted device. As shown in FIG. 1A, the optical assembly 102 allows the user to view the real-world scene 100 while simultaneously presenting a virtual graphic 104 to the user. In the illustrated example, virtual graphic 104 is an icon, but in other examples, the virtual graphic 104 may include text, a picture, video, or other visual information that is generated by the optical assembly 102 for presentation to the user. However, as shown in FIG. 1A the virtual graphic 104 is positioned on the optical assembly 102 at the same location as the user's view of a real-world object 106 (e.g., illustrated as a shrub/bush in FIG. 1A). In some examples, the real-world object 106 may interfere with the user's visibility of the virtual graphic 104. That is, the real-world object 106 may be the same or similar color as the virtual graphic 104, and/or the contrast between the real-world object 106 and the virtual graphic 104 may be too low. Thus, in some conditions, the virtual graphic 104 may be difficult for the user to discern when it is co-located with the user's view of the real-world object 106.

Figure 1B:
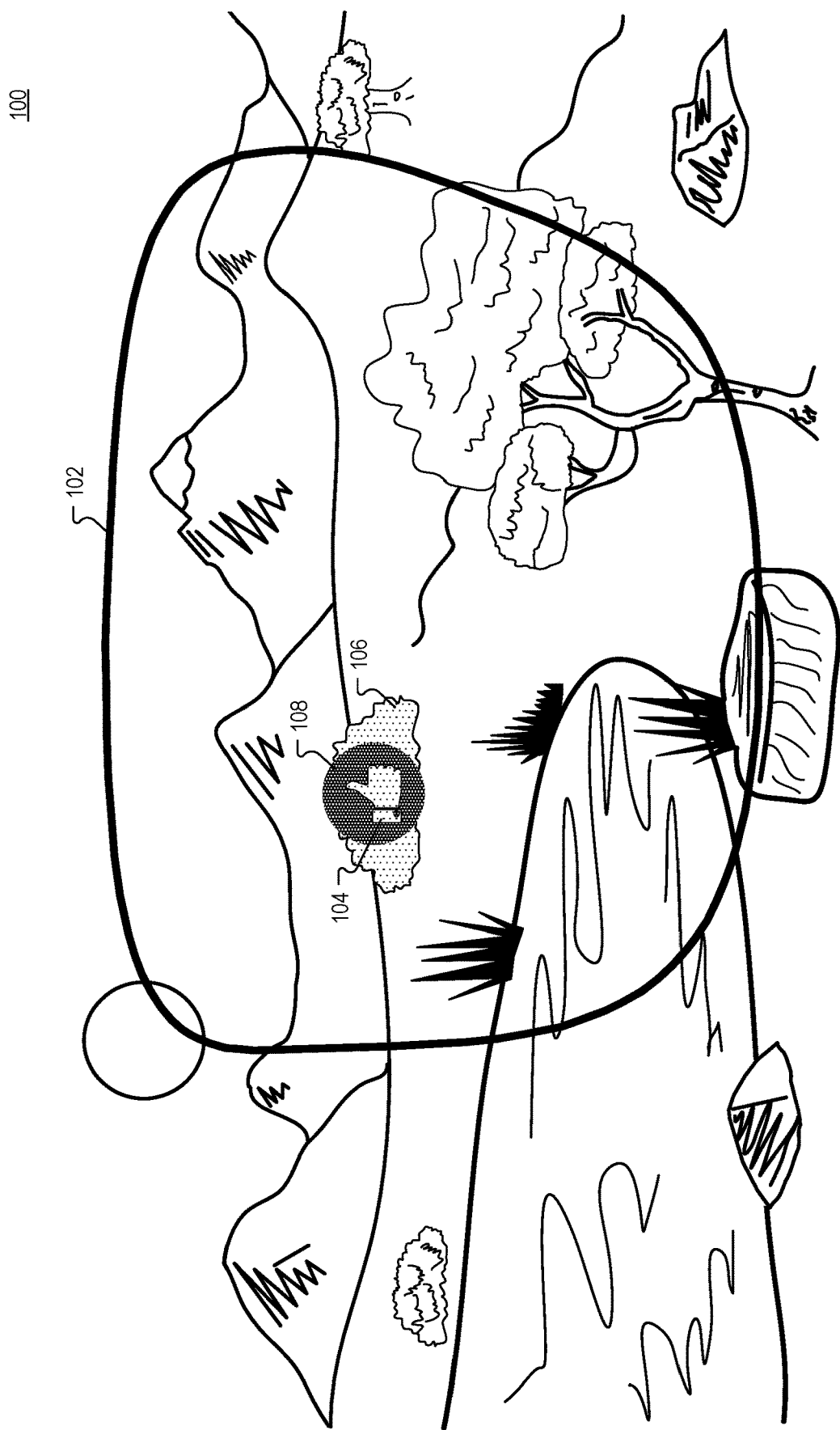

Accordingly, aspects of the present disclosure provide for the local dimming of light received from the real-world scene 100 to increase the visibility of the virtual graphic 104. For example, FIG. 1B illustrates the darkening of a region 108 that is provided by the optical assembly 102. As shown, the region 108 is darkened by the optical assembly 102 to dim or occlude light received from the real-world scene 100 at a location that corresponds to the real-world object 106 and the virtual graphic 104. In some examples, "local dimming" refers to dimming only a portion of the field-of-view provided by the optical assembly 102 (e.g., less than the entire field-of-view). FIG. 1B illustrates the virtual graphic 104 as being unchanged with respect to the view shown in FIG. 1A, but the virtual graphic 104 may have increased visibility due to the dimming of the real-world object 106 provided by the darkening of region 108.

The dimming provided by the optical assembly 102 may be provided by a dimming layer of the optical assembly 102 that includes a photochromic material that darkens in response to exposure to a range of light wavelengths. In some aspects, when activated, the photochromic material may undergo a reversible photochemical reaction that results in a change in its visible light absorption, in strength and/or wavelength.

In some embodiments, the darkening of a region of the dimming layer, such as region 108, is activated by way of one or more in-field dimmers that are included within the optical assembly 102. The in-field dimmer may include a waveguide, an extraction feature, a diffraction grating, and the like, that is incorporated within the optical assembly 102 where the in-field dimmer is configured to selectively emit an activation light to activate the darkening of the photochromic material corresponding to a particular region of the optical assembly 102.

In other embodiments, the darkening of the region 108 may be activated by a digital projector that is incorporated into the head-mounted device. For example, a digital projector may be mounted to a frame and/or temple arms of a head-mounted device to selectively emit an activation light to a particular region of the optical assembly 102 to activate the darkening of the photochromic material. These and other embodiments will be discussed in more detail below.

Figure 2:
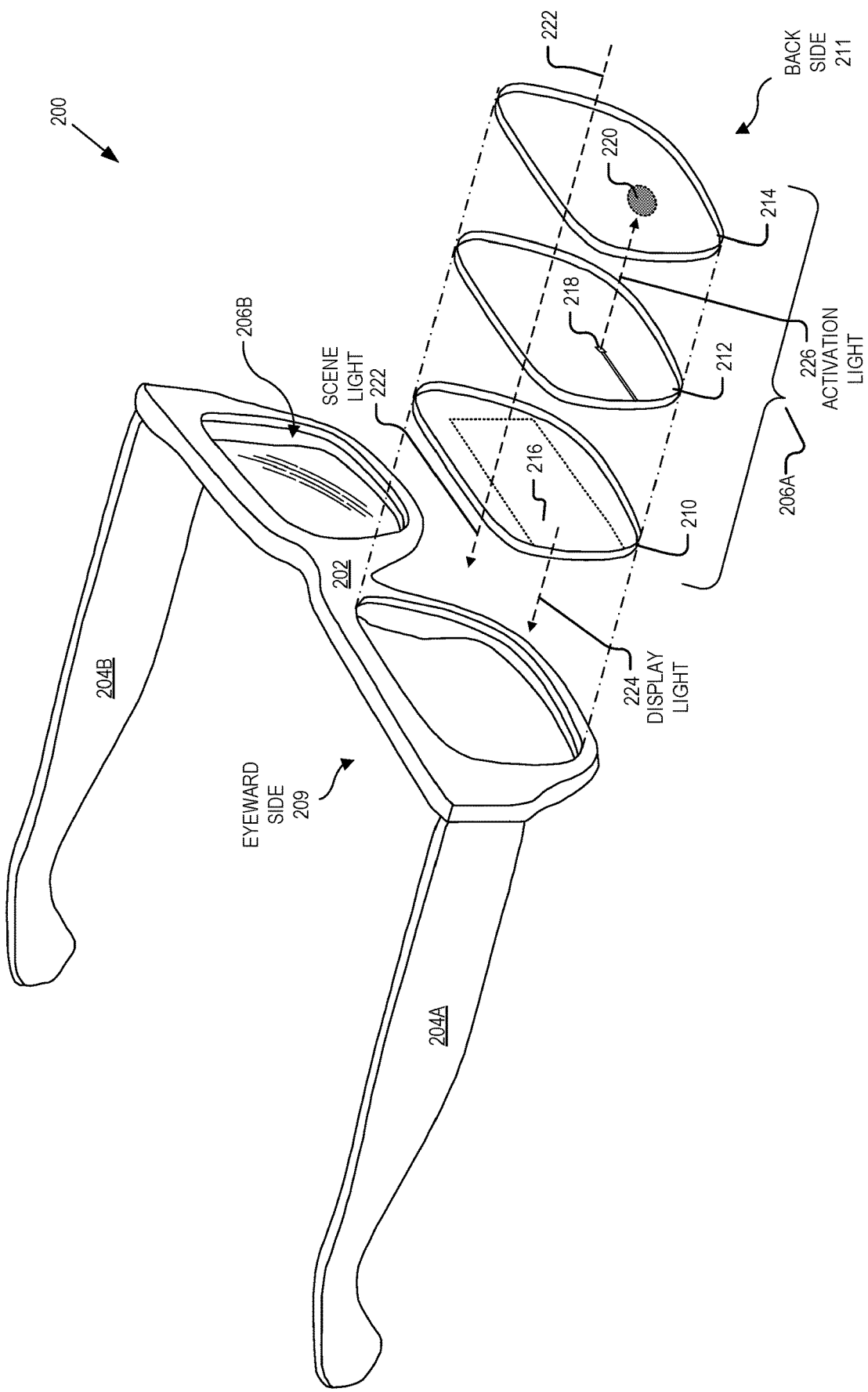
FIG. 2 illustrates a head-mounted device, in accordance with aspects of the present disclosure.

FIG. 2 illustrates an example head-mounted device 200, in accordance with aspects of the present disclosure. A head-mounted device, such as head-mounted device 200, is one type of smart device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

The illustrated example of head-mounted device 200 is shown as including a frame 202, temple arms 204A and 204B, and a near-eye optical assembly 206A and a near-eye optical assembly 206B. FIG. 2 also illustrates an exploded view of an example of near-eye optical assembly 206A. Near-eye optical assembly 206A is shown as including a display layer 210, an activation layer 212, and a dimming layer 214.

As shown in FIG. 2, frame 202 is coupled to temple arms 204A and 204B for securing the head-mounted device 200 to the head of a user. Example head-mounted device 200 may also include supporting hardware incorporated into the frame 202 and/or temple arms 204A and 204B. The hardware of head-mounted device 200 may include any of processing logic, wired and/or wireless data interfaces for sending and receiving data, graphic processors, and one or more memories for storing data and computer-executable instructions. In one example, head-mounted device 200 may be configured to receive wired power and/or may be configured to be powered by one or more batteries. In addition, head-mounted device 200 may be configured to receive wired and/or wireless data including video data.

FIG. 2 illustrates near-eye optical assemblies 206A and 206B that are configured to be mounted to the frame 202. The frame 202 may house the near-eye optical assemblies 206A and 206B by surrounding at least a portion of a periphery of the near-eye optical assemblies 206A and 206B. The near-eye optical assembly 206A is configured to receive visible scene light 222 at a backside 211 of the near-eye optical assembly 206A and to direct the visible scene light 222 on an optical path towards the eyeward side 209. In some examples, near-eye optical assembly 206A may appear transparent to the user to facilitate augmented reality or mixed reality such that the user can view visible scene light 222 from the environment while also receiving display light 224 directed to their eye(s) by way of display layer 210. In further examples, some or all of the near-eye optical assemblies 206A and 206B may be incorporated into a virtual reality headset where the transparent nature of the near-eye optical assemblies 206A and 206B allows the user to view an electronic display (e.g., a liquid crystal display (LCD), an organic light emitting diode (OLED) display, a micro-LED display, etc.) incorporated in the virtual reality headset.

As shown in FIG. 2, the display layer 210 is disposed on the optical path of the near-eye optical assembly 206A, between the eyeward side 209 and the backside 211 of the near-eye optical assembly 206A. In particular, the display layer 210 is disposed between the eyeward side 209 and the dimming layer 214. In some examples, display layer 210 may include a waveguide 216 that is configured to direct display light 224 to present one or more virtual graphics to an eye of a user of head-mounted device 200. In some aspects, waveguide 216 is configured to direct display light 224 that is generated by an electronic display to the eye of the user. In some implementations, at least a portion of the electronic display is included in the frame 202 of the head-mounted device 200. The electronic display may include an LCD, an organic light emitting diode (OLED) display, micro-LED display, pico-projector, or liquid crystal on silicon (LCOS) display for generating the display light 224.

FIG. 2 illustrates the dimming layer 214 as being disposed on the optical path of the near-eye optical assembly 206A, between the eyeward side 209 and the backside 211. In particular, the dimming layer 214 is shown as being disposed between the display layer 210 and the backside 211. In some examples, the dimming layer 214 includes a photochromic material that is configured to darken in response to exposure to a range of light wavelengths. For example, the photochromic material may be configured to undergo a reversible photochemical reaction in response to exposure to non-visible light, such as infrared (IR) and/or ultraviolet (UV) light. In other examples, the photochromic material may be activated to darken in response to exposure to violet light having wavelengths in the range of 400 to 440 nm. In some aspects, the photochromic material is a film or dye that is applied to a transparent material, such as plastic or glass. In other aspects, the photochromic material is provided by a photochromic compound that is suspended within a transparent substrate, such as plastic or glass.

In some aspects, the photochromic material of the dimming layer 214 is distributed across the entire field-of-view provided by the near-eye optical assembly 206A (e.g., across the entire dimming layer 214). In other aspects, the photochromic material may be provided in only certain portions of the field-of-view (e.g., upper half of the dimming layer 214).

FIG. 2 also shows the near-eye optical assembly 206A as including an activation layer 212 that is disposed on the optical path of the near-eye optical assembly 206A, adjacent to the dimming layer 214. Although the illustrated example shows the activation layer 212 as being disposed on the eyeward side 209 of the dimming layer 214, in other examples, the activation layer 212 may be disposed on the backside 211 of the dimming layer 214. The activation layer 212 is also shown as including at least one in-field dimmer 218. The in-field dimmer is configured to selectively emit an activation light 226 to activate a darkening of a region 220 of the dimming layer 214. In some examples, the activation light 226 is within the range of light wavelengths that activate the photochromic material of the dimming layer 214 (e.g., IR light, UV light, violet light, etc.).

In some examples, the in-field dimmer 218 may be disposed on a transparent substrate and may be configured to emit the activation light 226 towards the dimming layer 214. In some aspects, the in-field dimmer 218 may include a waveguide that is configured to direct light generated by a light source that is incorporated into the rim of frame 202 to an extraction feature or diffraction grating for emitting the light as activation light 226 towards the dimming layer 214. The light source that generates the activation light may be a light emitting diode, a micro light emitting diode (micro-LED), an edge emitting LED, a vertical cavity surface emitting laser (VCSEL) diode, or a Superluminescent diode (SLED).

As shown in FIG. 2, the in-field dimmer 218 is disposed within the field-of-view provided by the near-eye optical assembly 206A. While the in-field dimmer 218 may introduce minor occlusions into the near-eye optical assembly 206A, the in-field dimmer 218 may be so small as to be unnoticeable or insignificant to a wearer of head-mounted device 200. Additionally, any occlusion from in-field dimmer 218 will be placed so close to the eye as to be unfocusable by the human eye and therefore assist in the in-field dimmer 218 being not noticeable or insignificant.

In some examples, the activation layer 212 and/or the dimming layer 214 may have a curvature for focusing light (e.g., scene light 222) to the eye of the user. Thus, the activation layer 212 and/or the dimming layer 214 may, in some examples, may be referred to as lenses. In some aspects, the activation layer 212 and/or the dimming layer 214 have a thickness and/or curvature that corresponds to the specifications of a user. In other words, the activation layer 212 and/or dimming layer 214 may be a prescription lens.

As mentioned above, the in-field dimmer 218 of the activation layer 212 is configured to emit the activation light 226 towards the dimming layer 214 to activate a darkening of the region 220. In some examples, enabling of the in-field dimmer 218 is dynamically determined by a computing device of the head-mounted device 200. For instance, the head-mounted device 200 may include a computing device that determines whether the visible scene light 222 will interfere with the visibility of a virtual graphic generated by the visible display light 224 in the region 220. The computing device may make such a determination based on a comparison of a color of the visible scene light 222 within the region 220 and/or by determining a contrast between the visible scene light 222 and the visible display light 224 within region 220. If the color of the visible scene light 222 within region 220 is the same or similar to the color of the visible display light 224, and/or if the contrast between the visible scene light 222 and the visible display light 224 is lower than a low-contrast threshold, then the computing device may enable the in-field dimmer 218 to emit the activation light 226 to darken the region 220.

In some aspects, the photochemical reaction of the dimming layer 214 that is induced by the activation light 226 may be reversible. In one embodiment, disabling the in-field dimmer 218, such that it no longer emits the activation light 226, allows the photochromic material of the dimming layer 214 to naturally revert to its previous non-darkened state. In other embodiments, the head-mounted device 200 may be configured to actively restore the dimming layer 214 to its non-darkened state by directing a bleaching light to the dimming layer 214. In some examples, the bleaching light may be emitted by the in-field dimmer 218 or by other light sources (not explicitly shown) that are included in the head-mounted device 200. The bleaching light may be light having a wavelength that increases the rate at which the photochromic material is restored to its non-darkened state, such as visible light, UV light, and/or IR light.

Figure 3A:
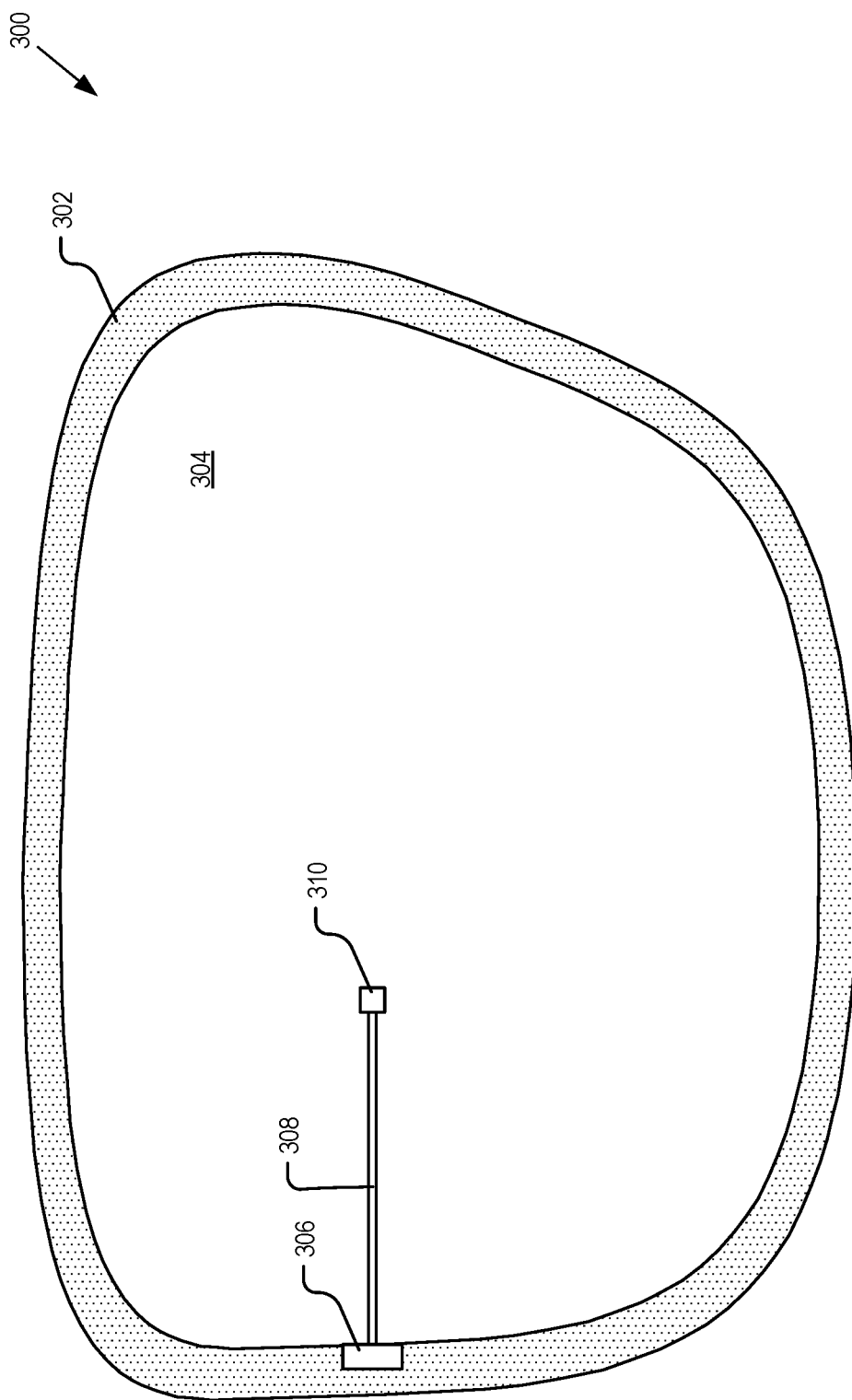
FIG. 3A illustrates a portion of a head-mounted device that includes an in-field dimmer, in accordance with aspects of the present disclosure.

FIG. 3A illustrates a portion of a head-mounted device 300 that includes an in-field dimmer, in accordance with aspects of the present disclosure. The illustrated example of head-mounted device 300 is shown as including a frame 302, a near-eye optical assembly 304, a light source 306, an optical waveguide 308, and an extraction feature 310 (optical waveguide 308 and extraction feature 310 are collectively referred to herein as an in-field dimmer). Head-mounted device 300 is one possible implementation of head-mounted device 200 of FIG. 2, where frame 302 corresponds to frame 202 and near-eye optical assembly 304 corresponds to near-eye optical assembly 206A.

As shown in FIG. 3A, the light source 306 may be incorporated into the frame 302 of the head-mounted device 300, where the light source 306 is configured to selectively generate an activation light (e.g., activation light 226 of FIG. 2). The optical waveguide 308 may be a transparent high-index waveguide that is embedded within a low-index cladding of the dimming layer (e.g., dimming layer 214). In some examples, the optical waveguide 308 is optically coupled to the light source 306 by way of an index-matching prism or by a grating incoupler. The optical waveguide 308 is configured to direct the activation light (e.g., by total internal reflection) from the light source 306, at a periphery of the near-eye optical assembly 304, to the extraction feature 310 that is within the field-of-view.

The extraction feature 310 is optically coupled to the optical waveguide 308 and is configured to emit the activation light towards the dimming layer to activate the darkening of a region of the near-eye optical assembly 304. For example, FIG. 3B illustrates the head-mounted device 300 where the in-field dimmer is enabled to darken a region 312 of the near-eye optical assembly 304. In some examples, the extraction feature 310 includes a tapered expander to outcouple the activation light to have an extended beam width.

Figure 4A:
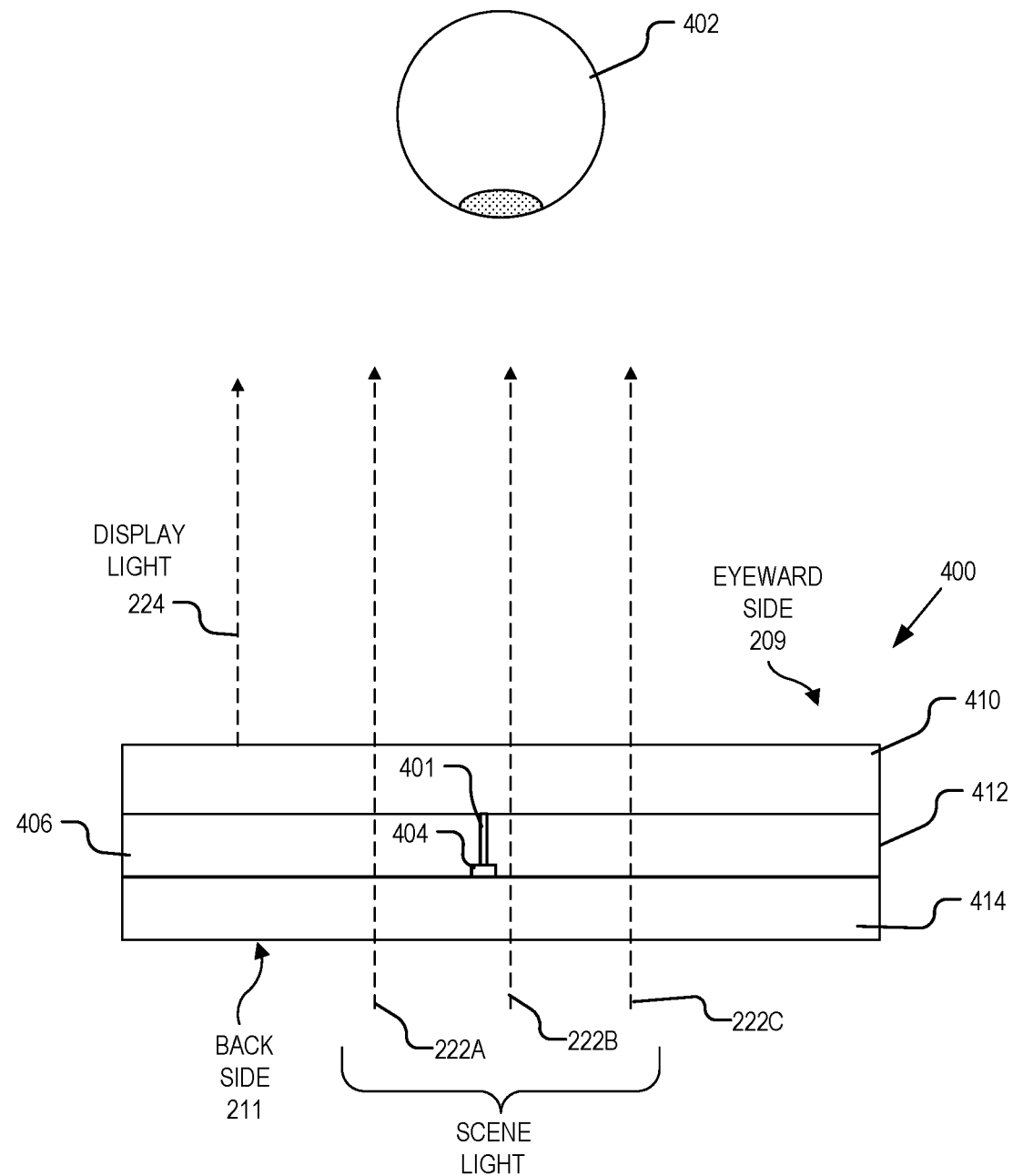
FIG. 4A is a cross-sectional view of a near-eye optical assembly, in accordance with aspects of the present disclosure.

FIG. 4A is a cross-sectional view of a near-eye optical assembly 400, in accordance with aspects of the present disclosure. The illustrated example of near-eye optical assembly 400 is shown as including a display layer 410, an activation layer 412, and a dimming layer 414. Also shown in FIG. 4A is an eye 402 of a user of the head-mounted device. Near-eye optical assembly 400 is one possible implementation of the near-eye optical assembly 206A of FIG. 2.

As shown in FIG. 4A, the display layer 410 is configured to direct visible display light 224 towards the eyeward side 209 of the near-eye optical assembly 400 for presenting one or more virtual graphics to the eye 402. The near-eye optical assembly 400 is also shown as receiving visible scene light 222A-222C at the backside 211, where the near-eye optical assembly 400 is configured to direct the visible scene light 222A-222C to the eyeward side 209 for viewing by the eye 402. The activation layer 412 is shown as including an optical waveguide 401 that is optically coupled to the extraction feature 404. The optical waveguide 401 and extraction feature 404 as shown as being embedded within a transparent material 406 of the activation layer 412. When the in-field dimmer (e.g., optical waveguide 401 and extraction feature 404) are disabled (i.e., not emitting activation light), then scene light 222A-222C is allowed to propagate through the dimming layer 414 substantially unaffected.

Figure 4B:
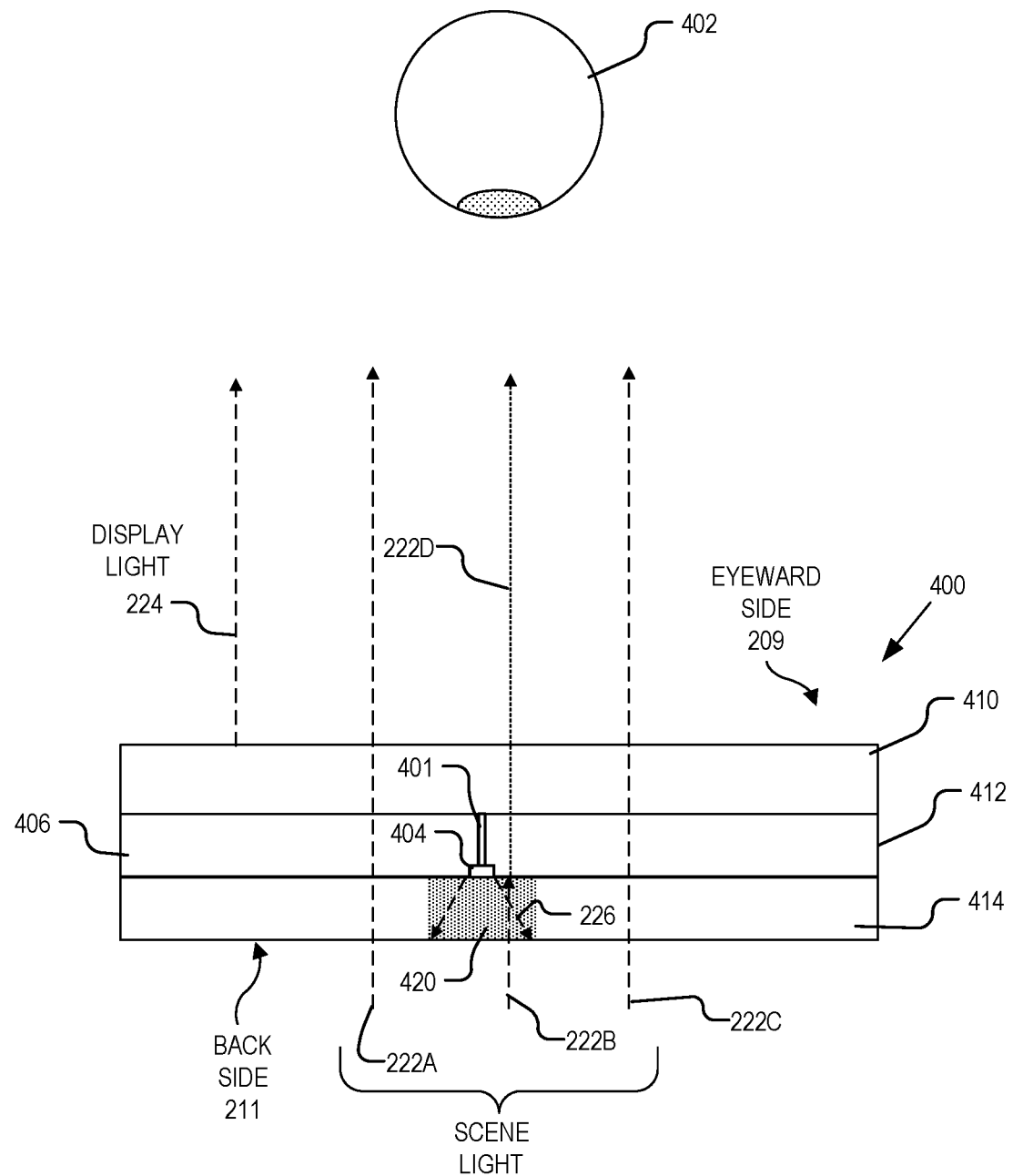
FIG. 4B is a cross-sectional view of the near-eye optical assembly of FIG. 4A with a darkened region of a dimming layer, in accordance with aspects of the present disclosure.

FIG. 4B is a cross-sectional view of the near-eye optical assembly 400 of FIG. 4A when the in-field dimmer is enabled to emit the activation light 226 to activate a darkening of region 420 within the dimming layer 414. As shown in FIG. 4B, the darkening of the photochromic material within the dimming layer 414 is limited to the region 420, where scene light 222A and 222C, that does not pass through the region 420, continues to propagate through the dimming layer 414 substantially unaffected, whereas the scene light 222B, which does pass through region 420, is indeed dimmed to dimmed scene light 222D. In some examples, the darkening of region 420 increases the absorption of the visible scene light 222B, such that the visible scene light 222D has a lower brightness than visible scene light 222B. In other examples, the darkening of region 420 may block the visible scene light 222B such that substantially none of the visible scene light 222B is passed through the dimming layer 414.

Figure 5:
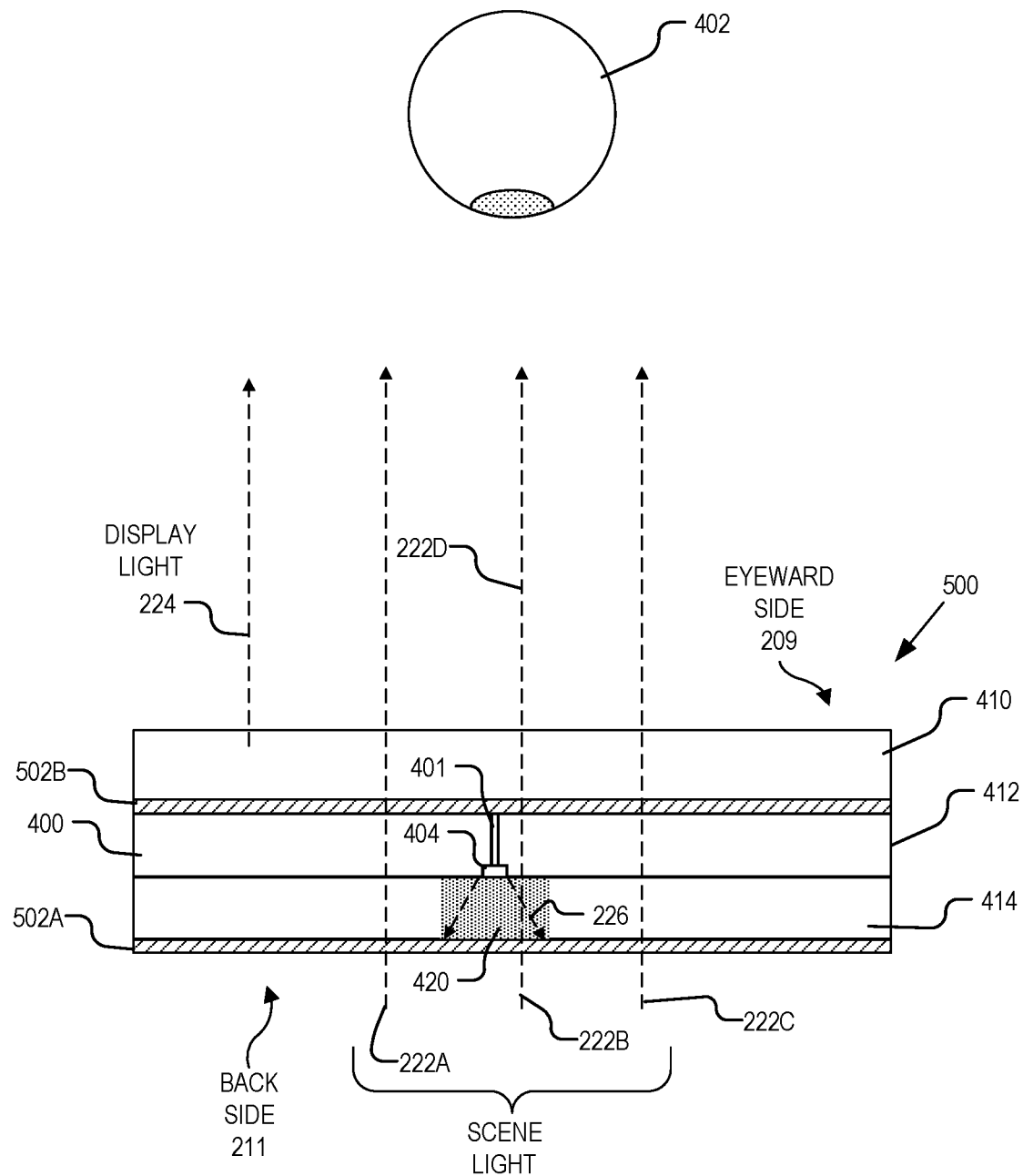
FIG. 5 is a cross-sectional view of a near-eye optical assembly that includes an eyeward side filter and a backside filter, in accordance with aspects of the present disclosure.

FIG. 5 is a cross-sectional view of a near-eye optical assembly 500 that includes a backside filter 502A and an eyeward side filter 502B, in accordance with aspects of the present disclosure. The near-eye optical assembly 500 is one possible implementation of the near-eye optical assembly 206A of FIG. 2.

As shown in FIG. 5, the backside filter 502A is disposed on the optical path of the near-eye optical assembly 500 between the backside 211 and the dimming layer 414. The backside filter 502A may be configured to absorb and/or reflect the activation light 226 to prevent leakage of the activation light 226 outside of the near-eye optical assembly 500. The backside filter 502A may also be configured to block external light (e.g., scene light or other light incident on the backside 211) that would activate the darkening of the photochromic material of the dimming layer 414. As further shown in FIG. 5, the backside filter 502A is configured to pass the visible scene light 222A-222C.

In some embodiments, the backside filter 502A is configured to be selectively switched between a first state and a second state. The first state may enable the backside filter 502A to block the range of light wavelengths (received at the backside 211) that would activate the darkening of the photochromic material of the dimming layer 414, while passing the visible scene light 222A-222C. The second state may enable the backside filter 502A to pass both the range of light wavelengths and the visible scene light 222A-222C. When in the second state, the backside filter 502A may allow the darkening of the dimming layer 414 across an entire field-of-view of the near-eye optical assembly 500, such as may be desirable in bright light conditions. In this embodiment, the backside filter 502A may include one or more of a switchable waveplate and at least one polarization layer.

FIG. 5, further illustrates the near-eye optical assembly 500 as including an eyeward side filter 502B that is disposed on the optical path of the near-eye optical assembly 500 between the eyeward side 209 and the dimming layer 414. The eyeward side filter 502B may be configured to absorb and/or reflect the activation light 226 to prevent leakage of the activation light 226 outside of the near-eye optical assembly 500. The eyeward side filter 502B may also be configured to block external light (e.g., scene light or other light incident on the eyeward side 209) that would activate the darkening of the photochromic material of the dimming layer 414. As further shown in FIG. 5, the eyeward side filter 502B is configured to pass the visible scene light 222A-222D.

Figure 6:
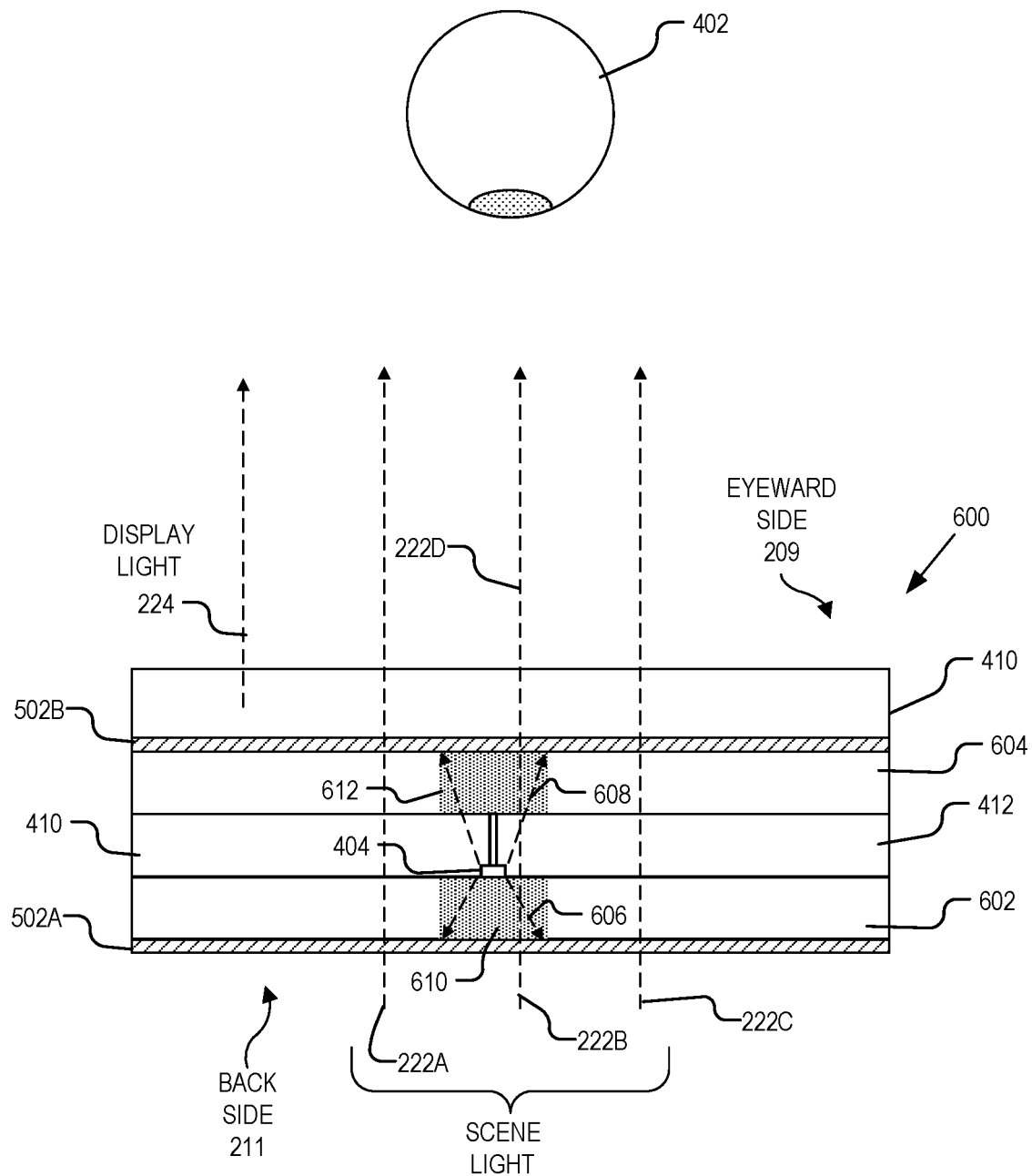
FIG. 6 is a cross-sectional view of a near-eye optical assembly that includes multiple dimming layers, in accordance with aspects of the present disclosure.

FIG. 6 is a cross-sectional view of a near-eye optical assembly 600 that includes multiple dimming layers 602 and 604, in accordance with aspects of the present disclosure. The near-eye optical assembly 600 is one possible implementation of the near-eye optical assembly 206A of FIG. 2.

In some implementations, the in-field dimmer (e.g., extraction feature 404) may be configured to emit activation light in multiple (e.g., opposite) directions. For example, FIG. 6 illustrates the extraction feature 404 as emitting activation light 608 towards the eyeward side 209 as well as emitting activation light 606 towards the backside 211 of the near-eye optical assembly 600. Thus, in some examples, the near-eye optical assembly 600 may include multiple dimming layers, each including photochromic material. As shown in FIG. 6, the activation layer 412 is disposed between a first dimming layer 602 and a second dimming layer 604. The extraction feature 404 is configured to emit the activation light 606 towards the first dimming layer 602 to activate a darkening of a first region 610. The extraction feature is also configured to emit the activation light 608 towards the second dimming layer 604 to activate a darkening of a second region 612.

Figure 7:
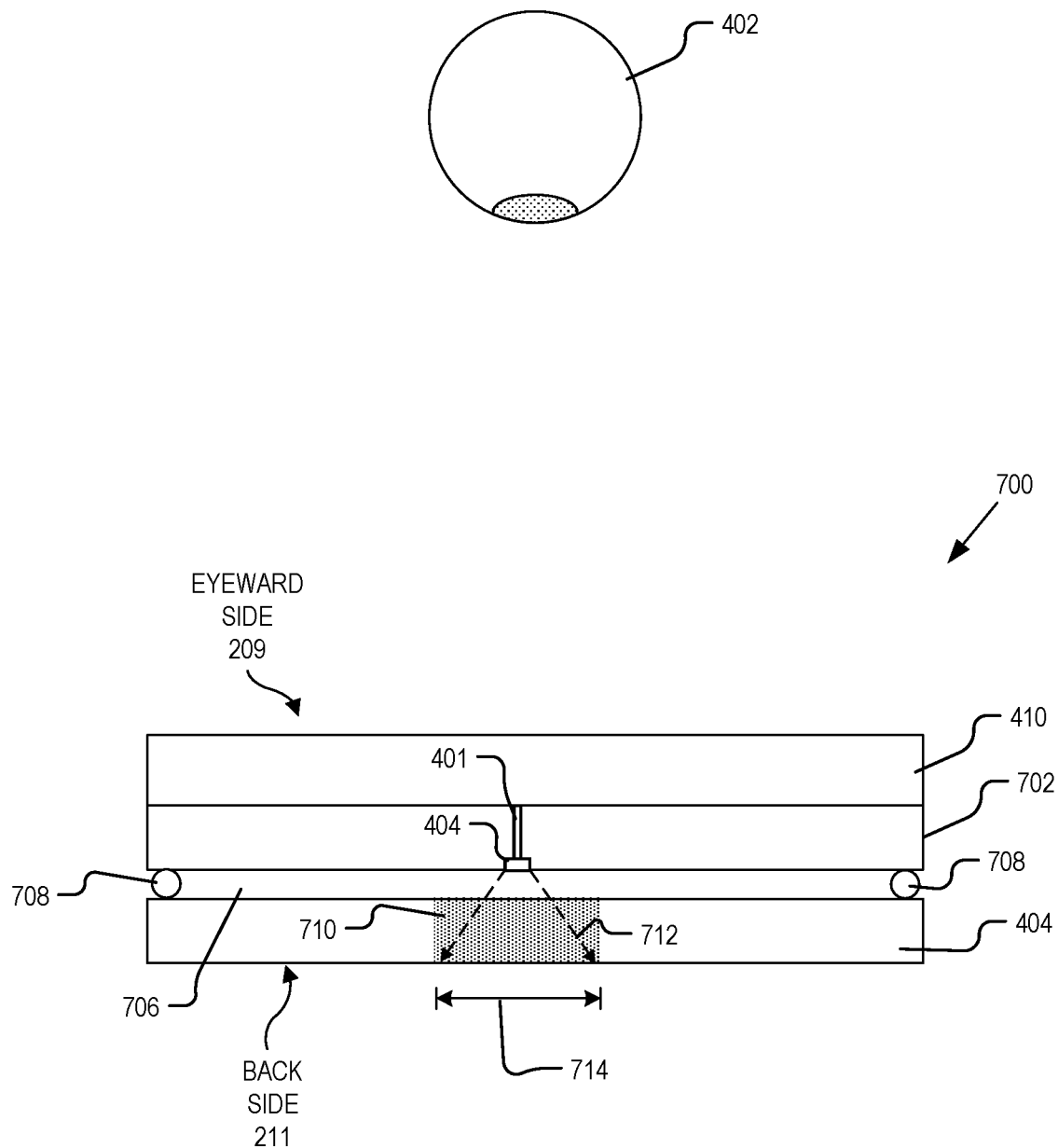
FIG. 7 is a cross-sectional view of a near-eye optical assembly that includes a gap for spacing a dimming layer apart from an activation layer, in accordance with aspects of the present disclosure.

FIG. 7 is a cross-sectional view of a near-eye optical assembly 700 that includes a gap 706 for spacing the dimming layer 414 apart from an activation layer 702, in accordance with aspects of the present disclosure. The near-eye optical assembly 700 is one possible implementation of the near-eye optical assembly 206A of FIG. 2. In some examples, the gap 706 may be provided to increase a beam width 714 of the activation light 712 and to also increase a size of the region 710 that is darkened. In one example, the gap 706 is provided by one or more spacers 708 placed between the activation layer 702 and the dimming layer 414, such that the gap 706 is an air gap. In other examples, gap 706 may be provided by a transparent layer, such as glass or plastic.

Figure 8:
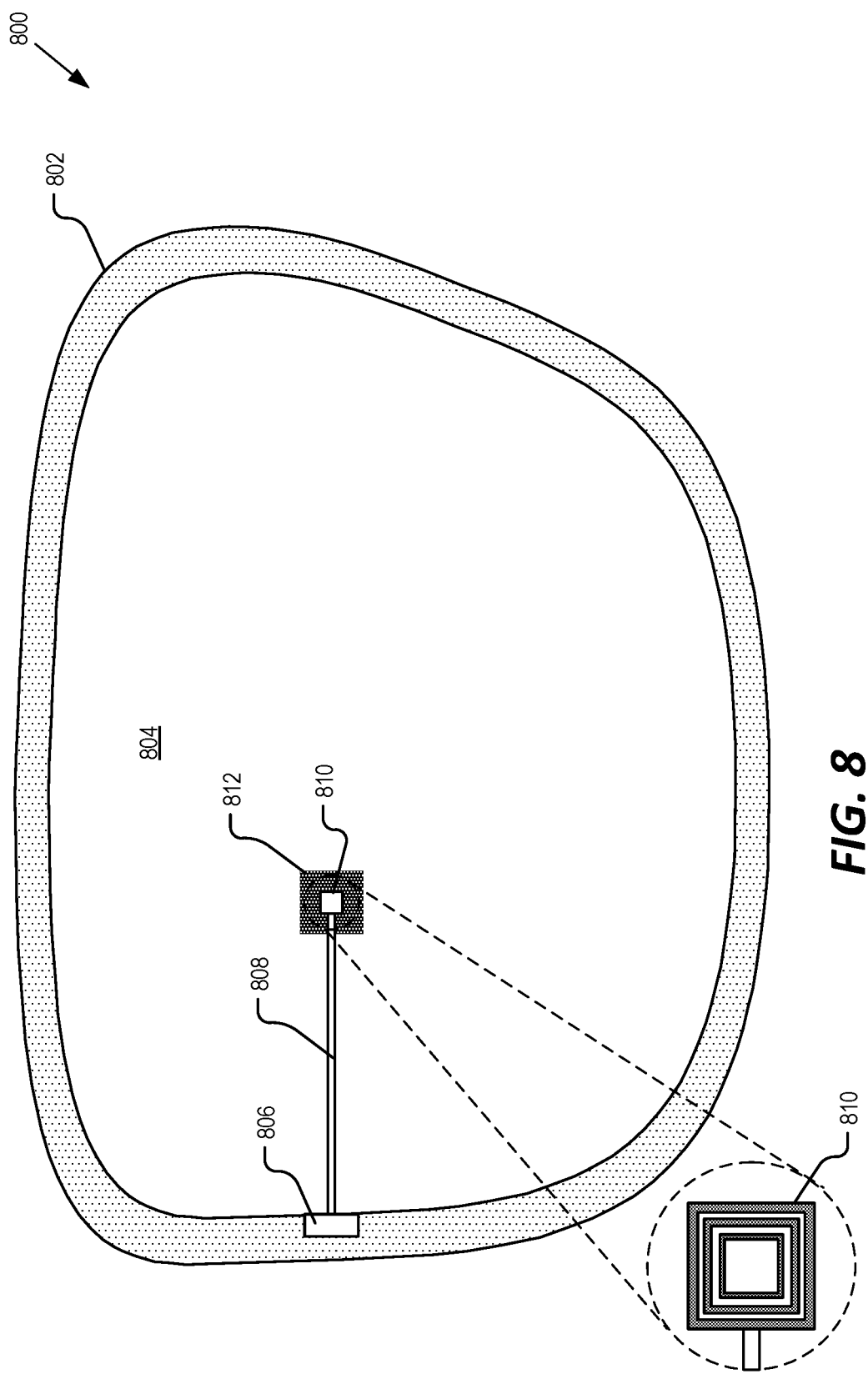
FIG. 8 illustrates a portion of the head-mounted device with a rectangularly-shaped darkened region, in accordance with aspects of the present disclosure.

In some aspects, the extraction feature included in the activation layer may be configured to emit activation light such that the region of the dimming layer that is darkened has a variety of shapes and/or configurations. For example, referring back to FIG. 3B, the extraction feature 310 is configured to emit the activation light such that the region 312 is circularly-shaped. In another implementation, FIG. 8 illustrates a portion of the head-mounted device 800 with a rectangularly-shaped darkened region 812, in accordance with aspects of the present disclosure. The illustrated example of head-mounted device 800 is shown as including a frame 802, an optical assembly 804, and a light source 806. The optical assembly 804 is shown as including an optical waveguide 808 and an extraction feature 810. As shown, the extraction feature 810 is configured to emit activation light having rectangular profile, resulting in a square-shaped region 812 that is darkened. In some embodiments the extraction feature 810 includes one or more microgratings, nanogratings, and/or metasurfaces that are designed and engineered to achieve a desired light output pattern. Head-mounted device 800 is one possible implementation of head-mounted device 200 of FIG. 2.

Figure 9A:
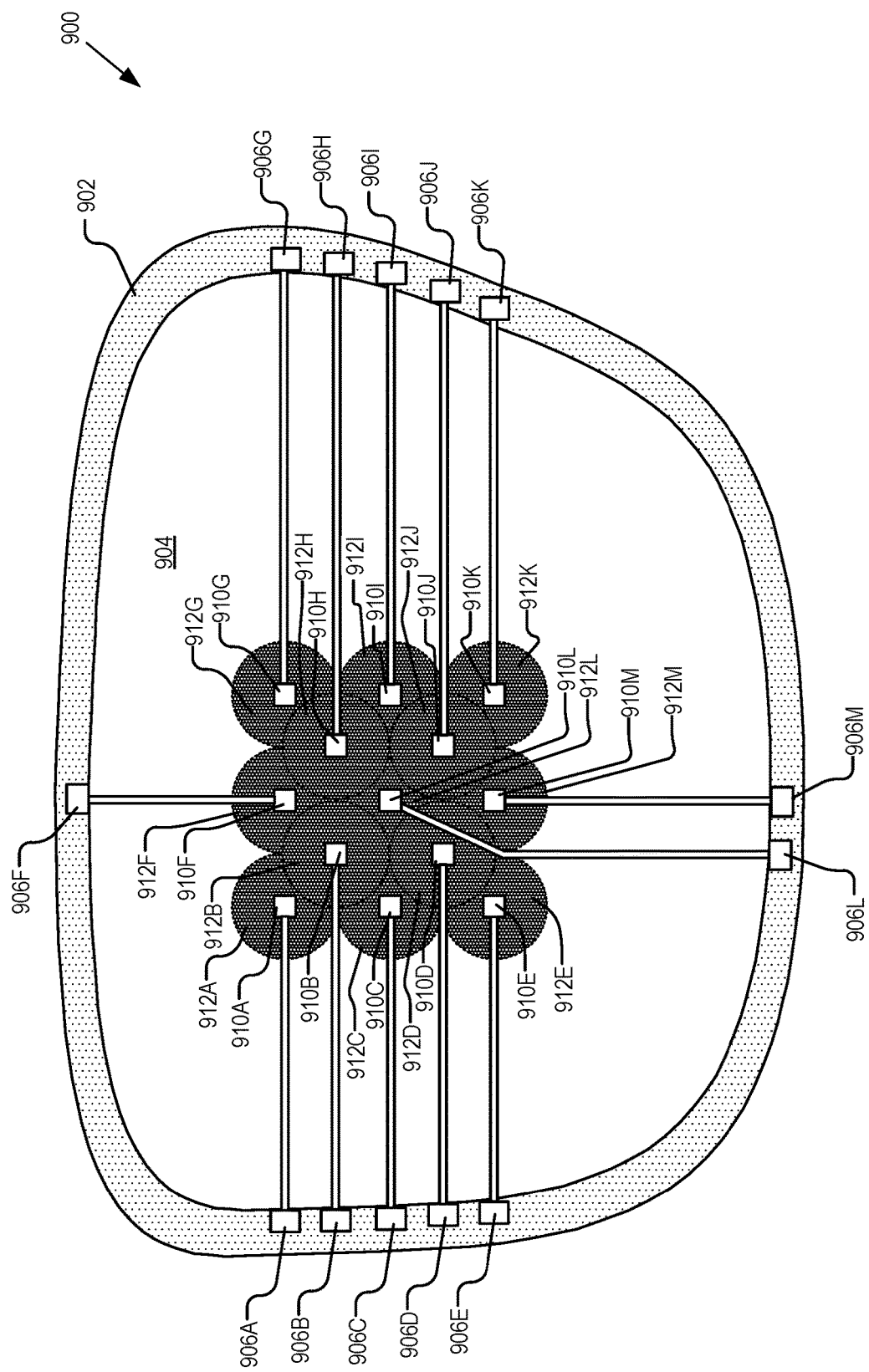
FIGS. 9A and 9B illustrate a portion of a head-mounted device that includes a near-eye optical assembly with multiple in-field dimmers, in accordance with aspects of the present disclosure.
Figure 9B:
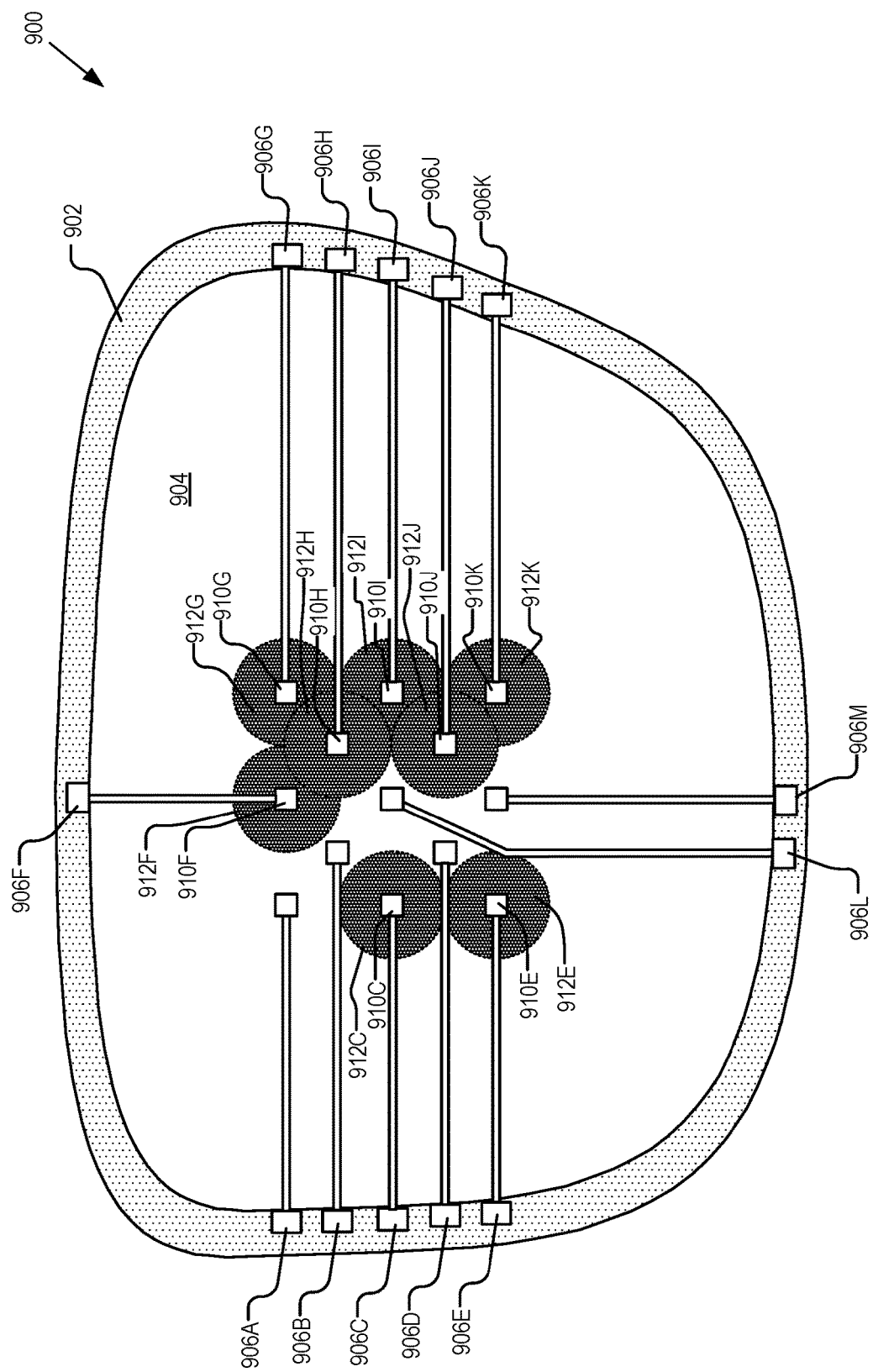

FIGS. 9A and 9B illustrate a portion of a head-mounted device 900 that includes a near-eye optical assembly 904 with multiple in-field dimmers (i.e., extraction features 910A-910M), in accordance with aspects of the present disclosure. The illustrated example of head-mounted device 900 is shown as including a frame 902 and a near-eye optical assembly 904. The frame 902 is shown as including light sources 906A-906M, while near-eye optical assembly 904 is shown as including extraction features 910A-910M. Head-mounted device 900 is one possible implementation of head-mounted device 200 of FIG. 2.

As shown in FIG. 9A, the frame 902 includes a plurality of light sources 906A-906M. Each of the light sources 906A-906M may be individually-controllable to generate a respective activation light. FIG. 9A further illustrates a plurality of extraction features 910A-910M coupled to receive the activation light from a respective light sources 906A-906M via a respective optical waveguide. Although FIG. 5A illustrates the near-eye optical assembly 904 as including thirteen in-field dimmers (e.g., extraction features 910A-910M), in other embodiments the near-eye optical assembly 904 may include any number of in-field dimmers, including one or more. In addition, the in-field dimmers may be arranged within the field-of-view in a variety of configurations, where the in-field dimmers provide coverage over only a portion of the field-of-view, or over the entire field-of-view.

As shown, each extraction feature 910A-910M is configured to emit activation light to darken a respective region 912A-912M of a dimming layer of the near-eye optical assembly 904. In some examples, a computing device of the head-mounted device 900 may selectively enable one or more of the light sources 906A-906M to dynamically darken a variety of the regions 912A-912M. In some examples, the determination of which of the regions 912A-912M to darken is based on the size, shape, number, and/or position of the virtual graphics that are to be generated by the near-eye optical assembly 904. FIG. 9B illustrates an example where light sources 906C, 906E, and 906F-906K are enabled to darken respective regions 912C, 912E, and 912F-912K, while light sources 906A, 906B, 906D, 906L, and 906M are disabled (i.e., not generating activation light).

Figure 10:
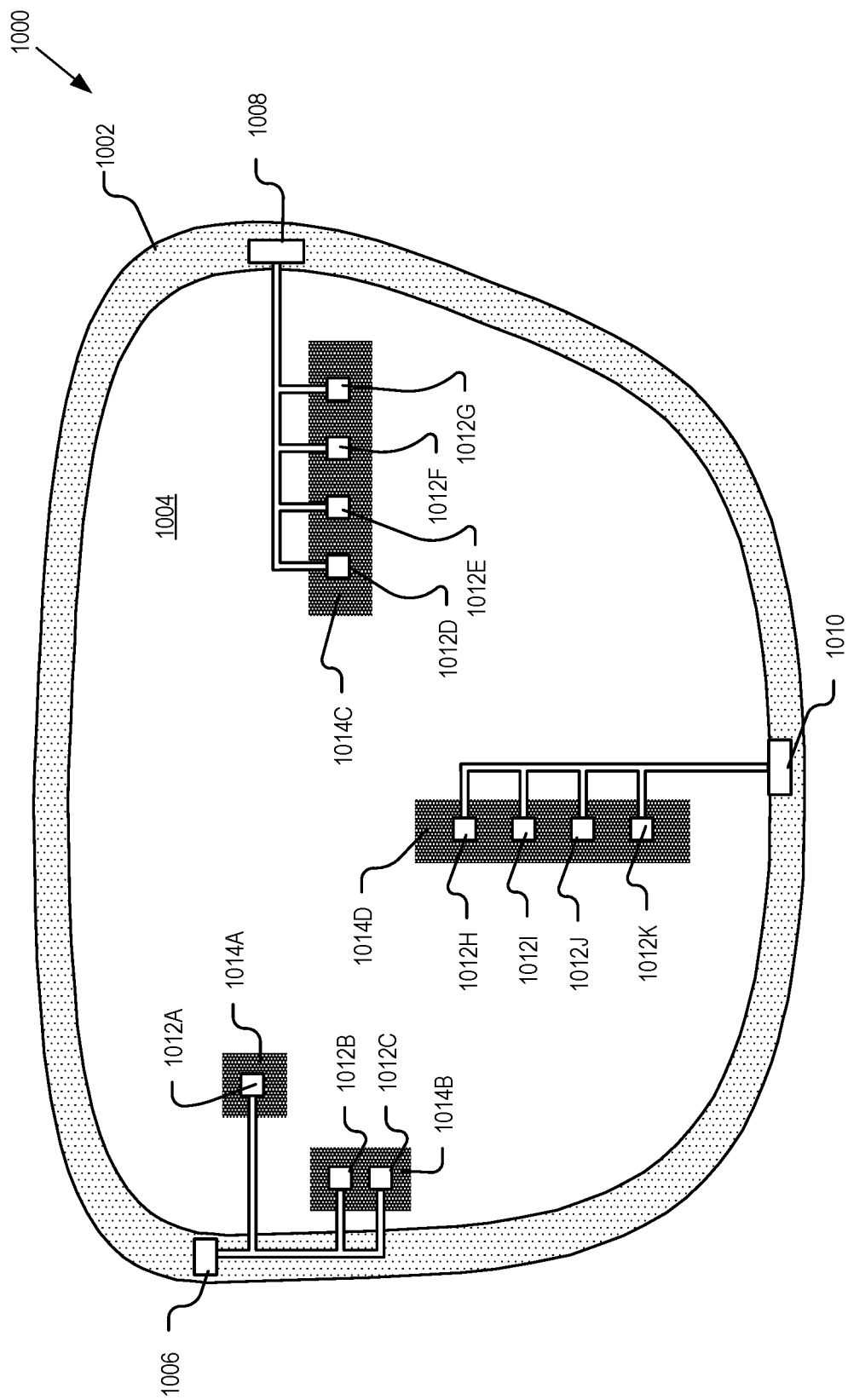
FIG. 10 illustrates a portion of a head-mounted device that includes a near-eye optical assembly with multiple in-field dimmers that provide separate and distinct darkened regions, in accordance with aspects of the present disclosure.

FIG. 10 illustrates a portion of a head-mounted device 1000 that includes a near-eye optical assembly 1004 with multiple in-field dimmers that provide separate and distinct darkened regions 1014A-1014C, in accordance with aspects of the present disclosure. Head-mounted device 1000 is one possible implementation of head-mounted device 200 of FIG. 2. Head-mounted device 1000 is shown as including a frame 1002 and a near-eye optical assembly 1004. The frame 1002 is shown as including light sources 1006, 1008, and 1010. The near-eye optical assembly 1004 is shown as including multiple in-field dimmers (i.e., extraction features 1012A-1012K).

In some implementations, the virtual graphics generated by the near-eye optical assembly 1004 may be generated in known and repeatable locations within the field-of-view. Accordingly, the in-field dimmers may be located within the near-eye optical assembly 1004 to provide regions 1014A-1014D that correspond to these known locations for the virtual graphics. In addition, each of the light sources 1006, 1008, and 1010 may be individually-controlled, such that each of the regions 1014A-1014D may be individually darkened based on a determined need.

Figure 11:
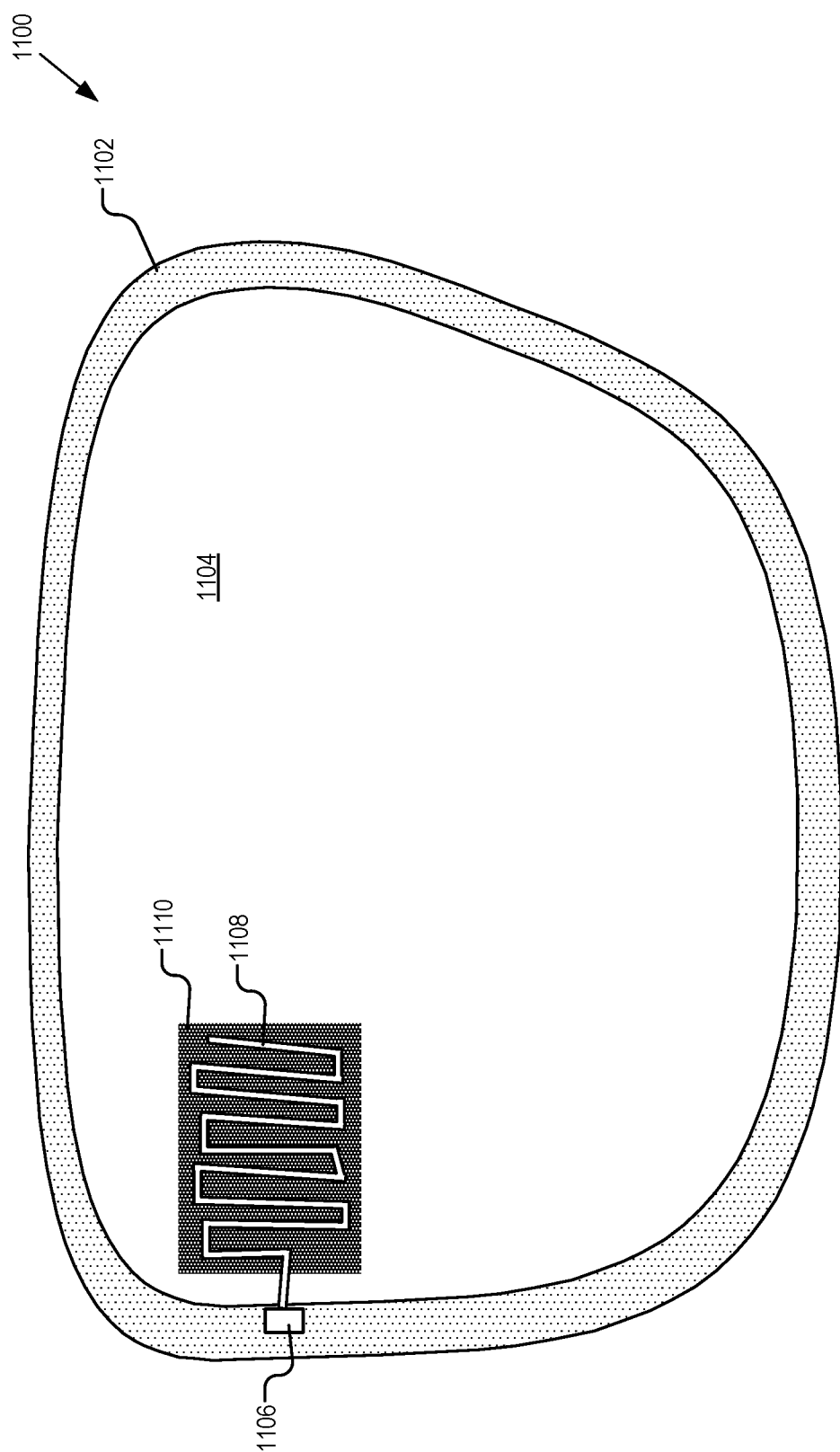
FIG. 11 illustrates a portion of a head-mounted device that includes a near-eye optical assembly with a waveguide for leaking activation light to provide a darkened region, in accordance with aspects of the present disclosure.

FIG. 11 illustrates a portion of a head-mounted device 1100 that includes a near-eye optical assembly 1104 with an optical waveguide 1108 for leaking activation light to provide a darkened region 1110, in accordance with aspects of the present disclosure. The illustrated example of head-mounted device 1100 is shown as including a frame 1102 and a near-eye optical assembly 1104. The frame 1102 is shown as including a light source 1106 and the near-eye optical assembly 1104 is shown as including the optical waveguide 1108. Head-mounted device 1100 is one possible implementation of head-mounted device 200 of FIG. 2.

The above-described examples of an in-field dimmer are provided by way of a dedicated extraction feature that is coupled to an optical waveguide. However, in some embodiments, the extraction features may be omitted, where the optical waveguide is configured to leak the activation light towards the dimming layer of the near-eye optical assembly. For example, the optical waveguide 1108 may be designed to be intrinsically lossy in a controlled manner as the activation light propagates through it. The activation light may leave the optical waveguide 1108 towards the dimming layer to activation darkening in a region 1110. In another example, the optical waveguide 1108 may be designed to be less lossy, but designed scatterers are arranged along the length of and integrated into the optical waveguide 1108. When the activation light propagates in the optical waveguide 1108 and meets a scatterer, a portion of the activation light leaks from the optical waveguide 1108 into the dimming layer to darken the region 1110.

Figure 12:
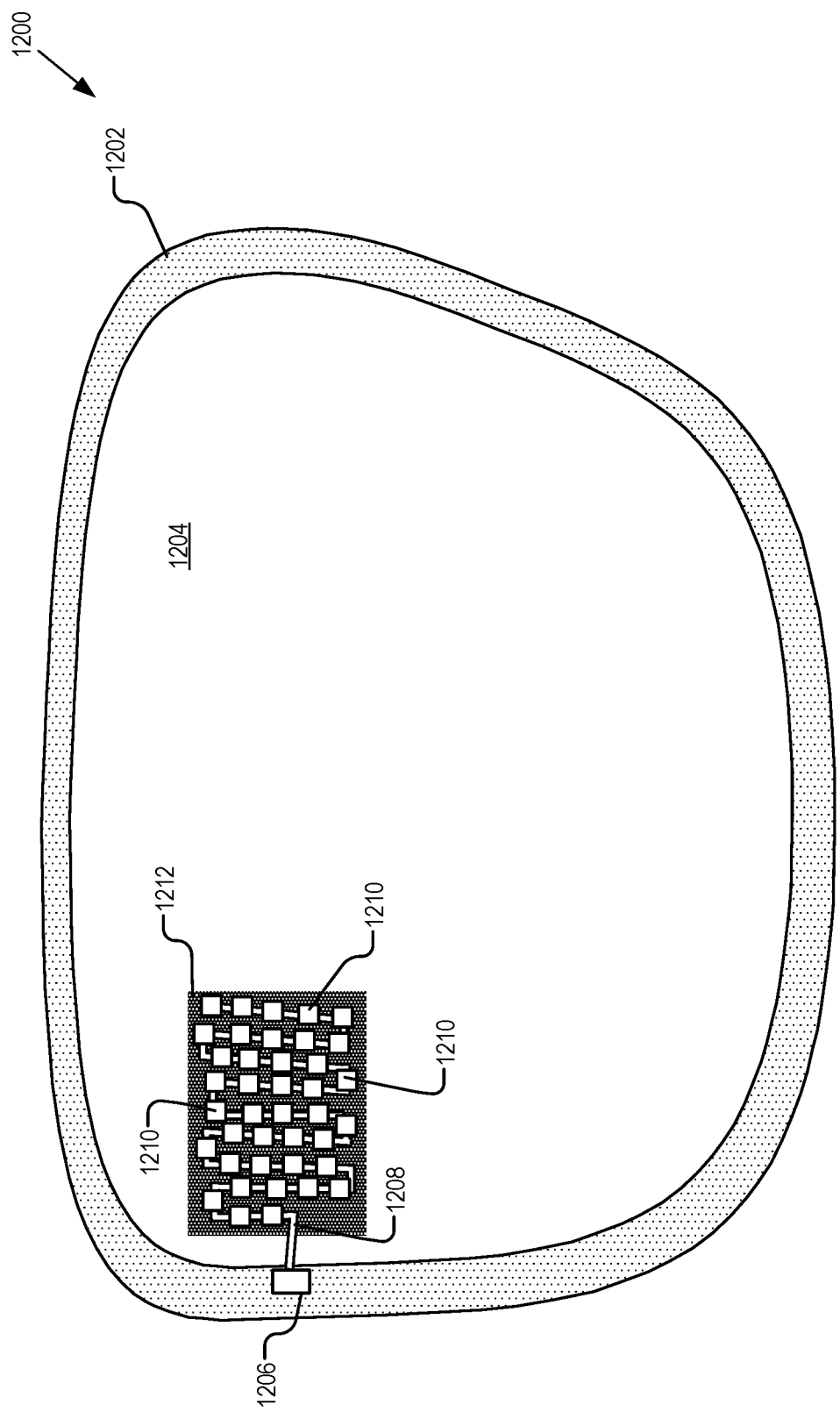
FIG. 12 illustrates a portion of a head-mounted device with an in-field dimmer that includes multiple extraction features optically coupled to a single waveguide, in accordance with aspects of the present disclosure.

FIG. 12 illustrates a portion of a head-mounted device 1200 with an in-field dimmer that includes multiple extraction features 1210 optically coupled to a single waveguide 1208, in accordance with aspects of the present disclosure. The illustrated example of head-mounted device 1200 is shown as including a frame 1202 and a near-eye optical assembly 1204. The frame 1202 is shown as including a light source 1206 and the near-eye optical assembly 1204 is shown as including the optical waveguide 1208 and a plurality of extraction features 1210. Head-mounted device 1200 is one possible implementation of head-mounted device 200 of FIG. 2.

As shown in FIG. 12, each of the extraction features 1210 are optically coupled to the optical waveguide 1208. In operation, the optical waveguide 1208 is configured to direct the activation light from the light source 1206 to each of the extraction features 1210, where each extraction feature 1210 is configured to emit the activation light towards the dimming layer to darken the region 1212.

Figure 13:
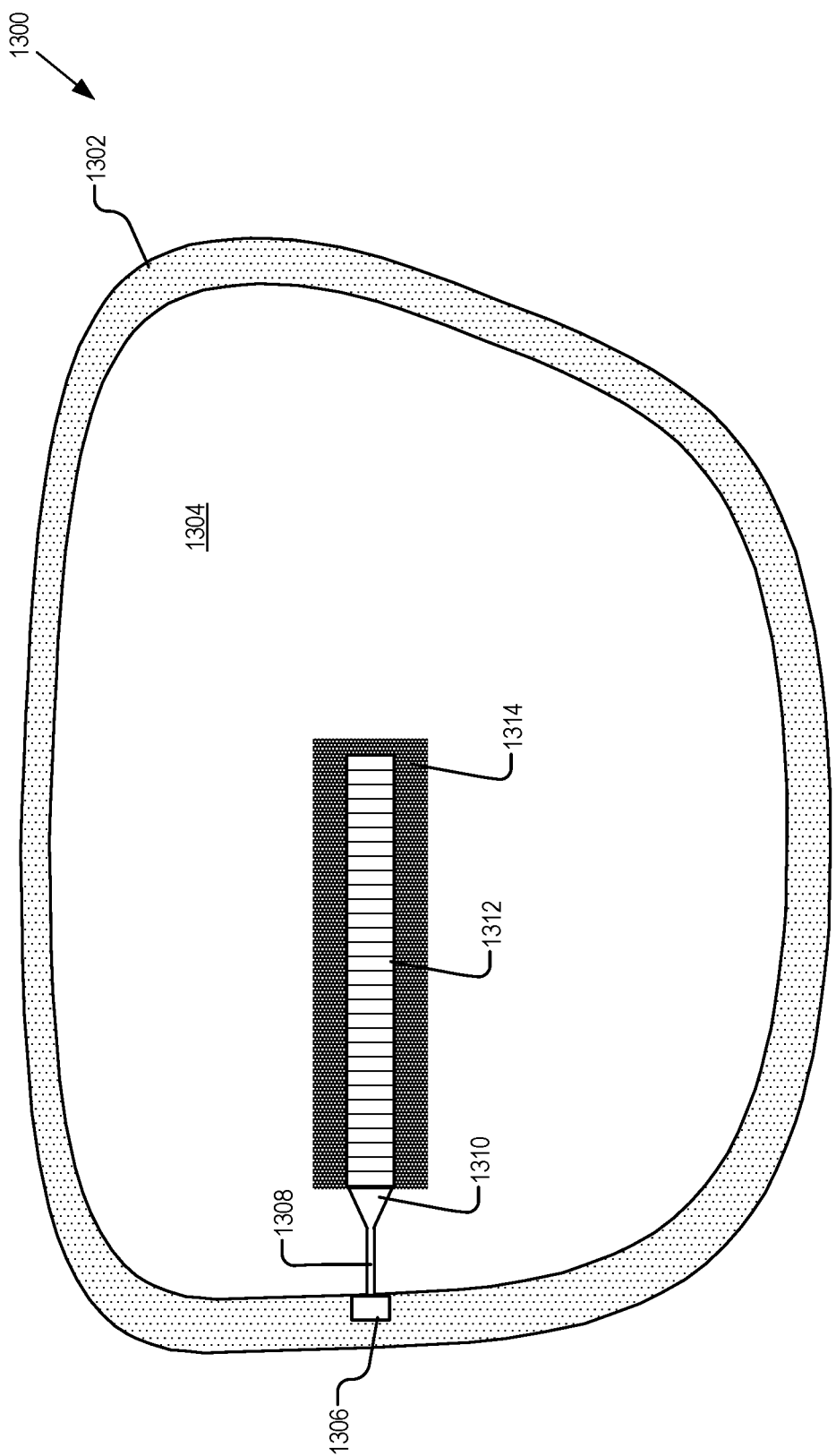
FIG. 13 illustrates a portion of a head-mounted device with an in-field dimmer that includes a diffraction grating, in accordance with aspects of the present disclosure.

FIG. 13 illustrates a portion of a head-mounted device 1300 with an in-field dimmer that includes a diffraction grating 1312, in accordance with aspects of the present disclosure. The illustrated example of head-mounted device 1300 is shown as including a frame 1302 and a near-eye optical assembly 1304. The frame 1302 is shown as including a light source 1306 and the near-eye optical assembly 1304 is shown as including the optical waveguide 1308, a tapered expander 1310, and diffraction grating 1312. Head-mounted device 1300 is one possible implementation of head-mounted device 200 of FIG. 2.

In the illustrated example, the diffraction grating 1312 (e.g., volume Bragg grating) is optically coupled to the optical waveguide 1308 by way of the tapered expander 1310. The optical waveguide 1308 is configured to direct the activation light from light source 1306 to the diffraction grating, where the diffraction grating 1312 is configured to direct the activation light towards the dimming layer to darken the region 1314.

Figure 14A:
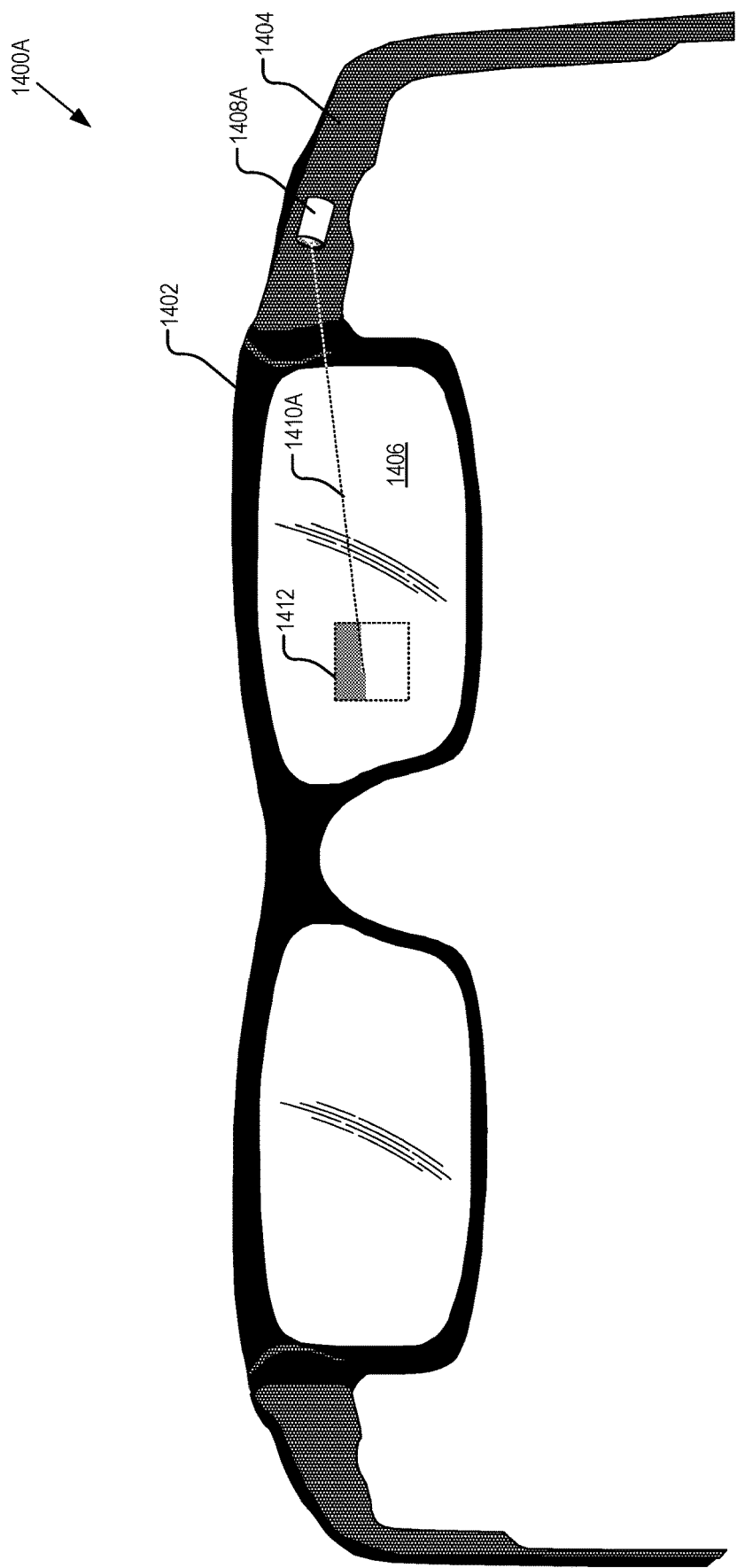
FIG. 14A illustrates an example head-mounted device that includes a digital projector, in accordance with aspects of the present disclosure.

The above-illustrated embodiments provide for the darkening of one or more regions of a dimming layer by way of one or more in-field dimmers that are included within the optical assembly. However, in other embodiments, the darkening of a region of the dimming layer be activated by a digital projector that is incorporated into the head-mounted device. For example, FIG. 14A illustrates a head-mounted device 1400A that includes a digital projector 1408A, in accordance with aspects of the present disclosure.

The illustrated example of head-mounted device 1400A is shown as including a frame 1402, a temple arm 1404, a near-eye optical assembly 1406, and the digital projector 1408A. In some aspects, the digital projector 1408A may be disposed on an eyeward side of the near-eye optical assembly 1406 on the temple arm 1404. As shown, the digital projector 1408A may be a laser scanner that is configured to emit activation light 1410A to activate a darkening of the region 1412 of a dimming layer included in the near-eye optical assembly 1406. In some embodiments, the activation light 1410A that is generated by the digital projector 1408A is a steerable laser beam of the range of light wavelengths that activate a darkening of the photochromic material included in the dimming layer.

In some aspects, the laser scanner of the digital projector 1408A is configured to direct the activation light 1410A by way of a raster scan within the region 1412 to activate the darkening of the dimming layer. Although FIG. 14A shows the digital projector 1408A as directing the activation light 1410A to darken a single rectangular region 1412, the digital projector 1408A may also be configured to direct the activation light 1410A to darken a plurality of separate and distinct regions of the dimming layer and in a variety of shapes (e.g., circular-shaped, irregular-shaped, oval-shaped, etc.). In some embodiments, the digital projector 1408A includes a single laser light source for generating the activation light 1410A. In other embodiments, the digital projector 1408A may include one or more additional light sources for generating display light to project a virtual graphic (e.g., virtual graphic 104 of FIGS. 1A and 1B) onto the near-eye optical assembly 1406. For example, the digital projector 1408A may include a first laser light source for generating the activation light 1410A (i.e., within the range of light wavelengths that darken the dimming layer) and additional red, green, and blue laser light sources for generating the virtual graphic.

Figure 14B:
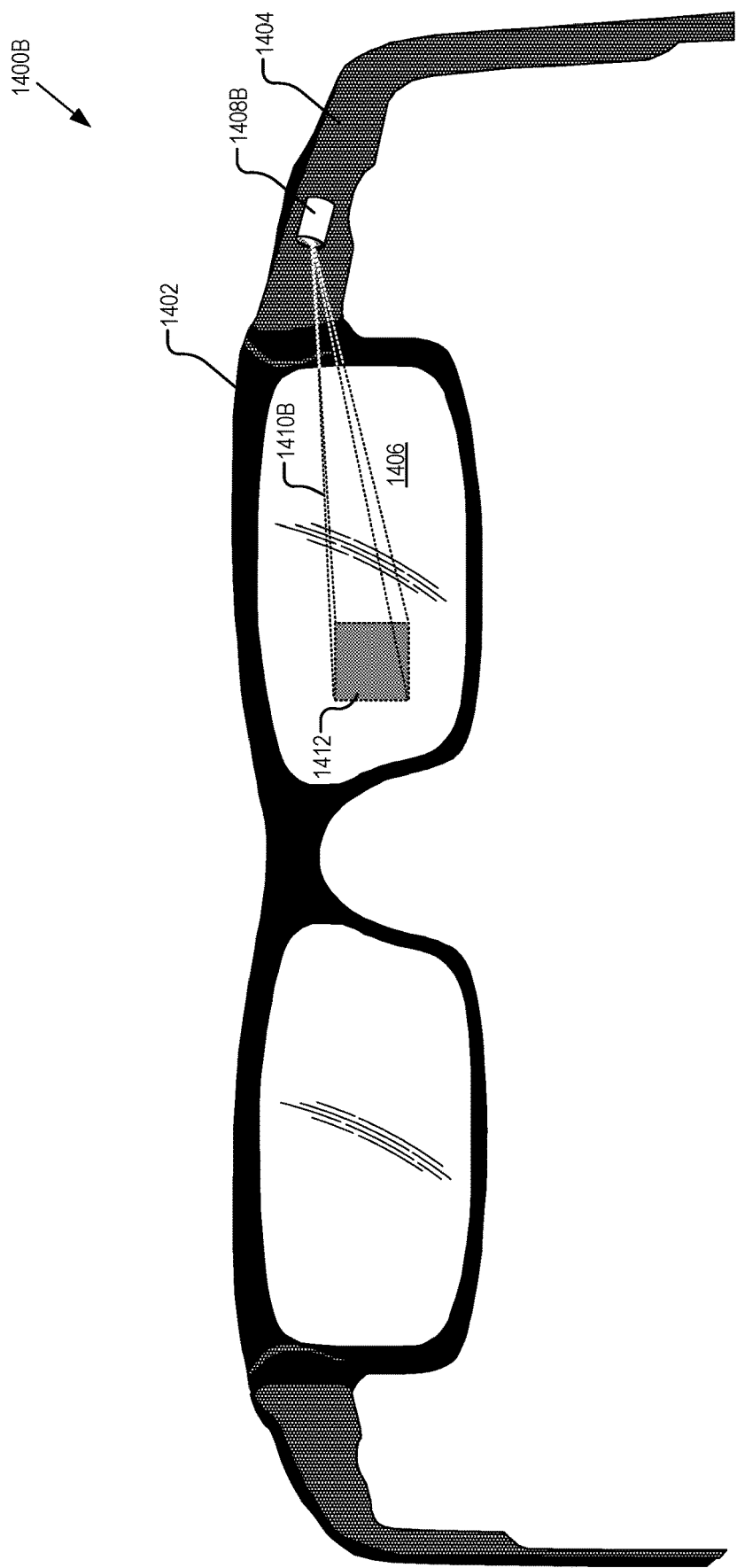
FIG. 14B illustrates another example of a head-mounted device that includes a digital projector, in accordance with aspects of the present disclosure.

As described above, the digital projector 1408A may include a laser scanner that is configured to direct the activation light 1410A by way of a raster scan within the region 1412 to activate the darkening of the dimming layer. However, in other embodiments, the digital projector may project activation light onto the entire region 1412, simultaneously. For example, FIG. 14B illustrates another head-mounted device 1400B that includes a digital projector 1408B, in accordance with aspects of the present disclosure. As shown in FIG. 14B, the digital projector 1408B is configured to emit activation light 1410B to simultaneously darken the entire region 1412.

In some aspects, digital projector 1408B includes a plurality of pixels that are configurable to generate activation light 1410B in a desired pattern to darken the region 1412. For example, digital projector 1408B may include a digital micro mirror device (DMD), a liquid-crystal-on-silicon (LCOS) device, a micro light emitting diode (uLED) device, or the like.

In some embodiments, the digital projector 1408B includes a single light source for generating the activation light 1410B. In other embodiments, the digital projector 1408B may include one or more additional light sources for generating display light to project a virtual graphic (e.g., virtual graphic 104 of FIGS. 1A and 1B) onto the near-eye optical assembly 1406. By way of example, when implemented as an LCOS device, the digital projector 1408B may include a first LCOS device for generating the activation light 1410B (i.e., within the range of light wavelengths that darken the dimming layer), and at least one additional LCOS device (e.g., red, green, and blue) for generating the virtual graphic. In operation, the digital projector 1408B may be configured to sequentially illuminate one LCOS device with red, green, and blue light and then illuminate the other LCOS device with the activation light 1410B (e.g., UV, IR, violet, etc.).

Figure 15:
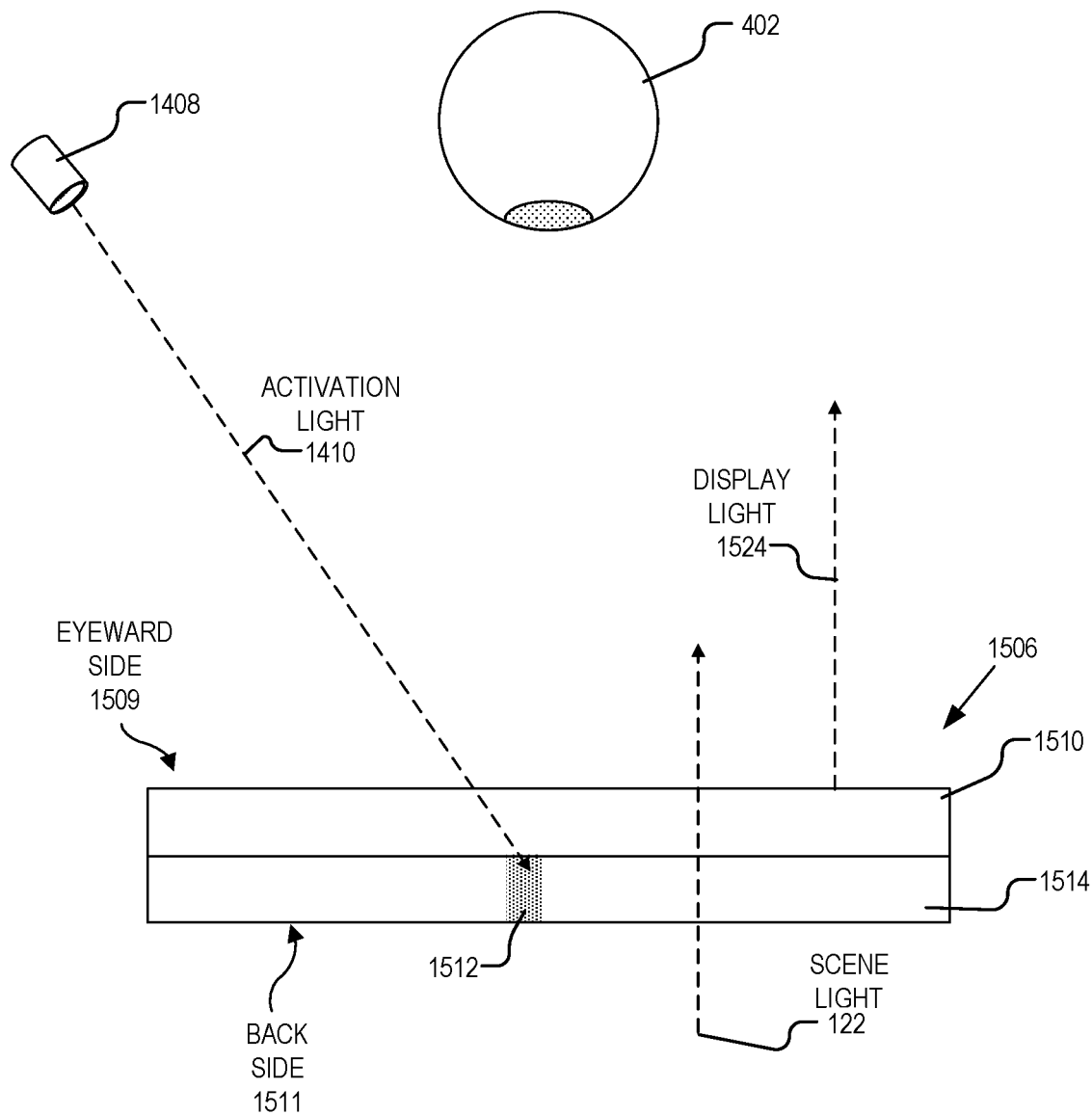
FIG. 15 is a cross-sectional view of a near-eye optical assembly of a head-mounted display for use with a laser scanner, in accordance with aspects of the present disclosure.

FIG. 15 is a cross-sectional view of a near-eye optical assembly 1506 of a head-mounted display for use with a laser scanner, in accordance with aspects of the present disclosure. Near-eye optical assembly 1506 is shown as including a display layer 1510 and a dimming layer 1514. Near-eye optical assembly 1506 is one possible implementation of the near-eye optical assembly 1406 of FIGS. 14A and 14B.

As shown in FIG. 15, the dimming layer 1514 is disposed on an optical path of the near-eye optical assembly 1506 between the eyeward side 1509 and the backside 1511. The display layer 1510 is disposed on the optical path between the dimming layer 1514 and the eyeward side 1509. The display layer 1510 is also shown as directing the display light 1524 towards the eyeward side 1509 for presenting one or more virtual graphics to the eye 402 of a user of the head-mounted device.

In some aspects, dimming layer 1514 is similar to dimming layer 414 of FIG. 4A, in that it includes a photochromic material that is configured to darken in response to exposure to a range of light wavelengths (e.g., IR, UV, violet, etc.). As shown in FIG. 15, the laser scanner 1408 is configured to emit the activation light 1410 that is within the range of light wavelengths to activate a darkening of region 1512 of the dimming layer 1514.

Figure 16:
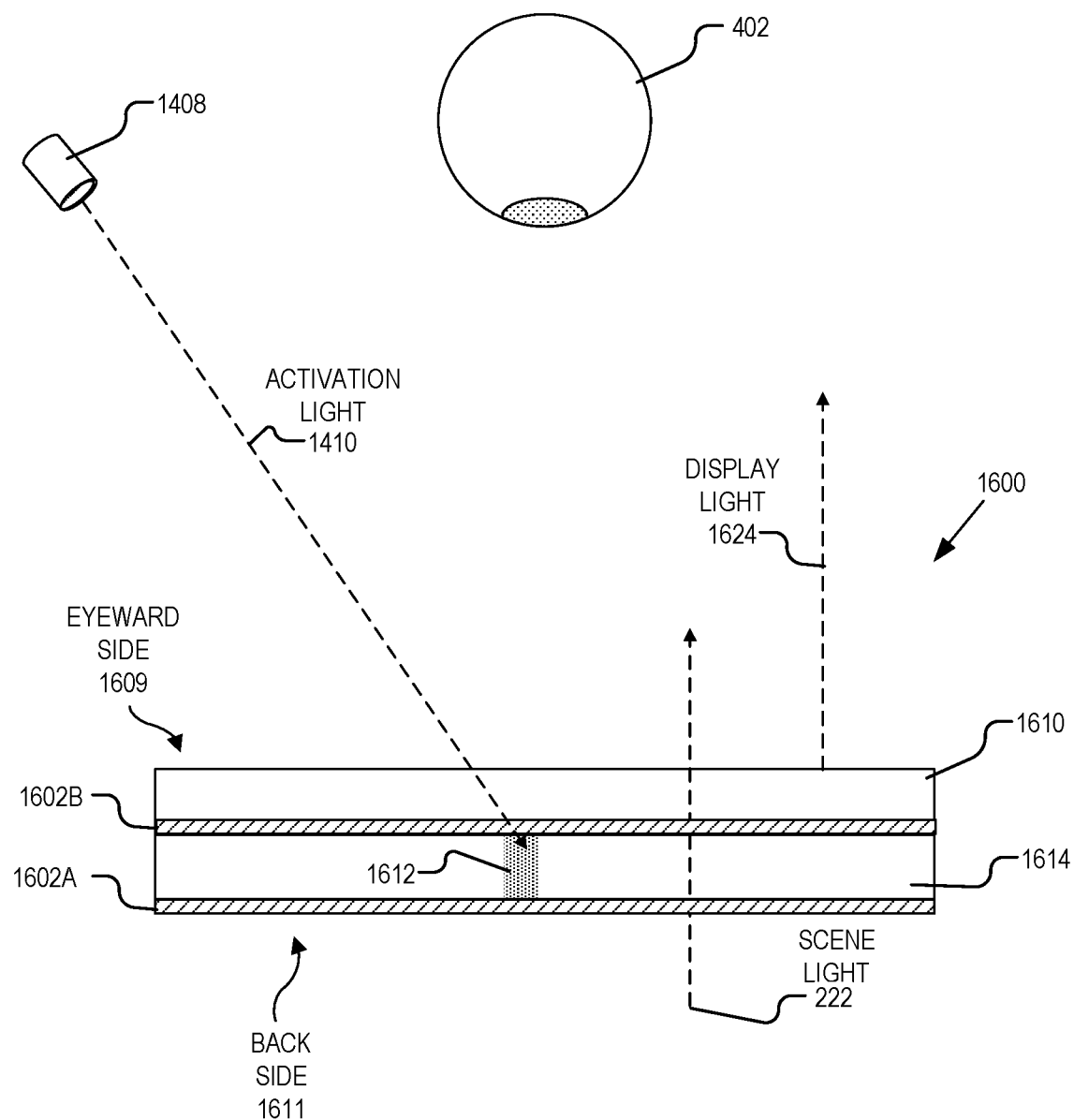
FIG. 16 is a cross-sectional view of a near-eye optical assembly that includes an eyeward side filter and a backside filter for use with a laser scanner, in accordance with aspects of the present disclosure.

FIG. 16 is a cross-sectional view of a near-eye optical assembly 1600 that includes a backside filter 1602A and an eyeward side filter 1602B for use with a laser scanner 1408, in accordance with aspects of the present disclosure. The illustrated example of near-eye optical assembly 1600 is shown as including a display layer 1610, a dimming layer 1614, backside filter 1602A, and eyeward side filter 1602B. The near-eye optical assembly 1600 is one possible implementation of the near-eye optical assembly 1406 of FIGS. 14A and 14B.

As shown in FIG. 15, the backside filter 1602A is disposed on the optical path of the near-eye optical assembly 1600 between the backside 1611 and the dimming layer 1614. The backside filter 1602A may be configured to absorb and/or reflect the activation light 1410 to prevent leakage of the activation light 1410 outside of the near-eye optical assembly 1600. The backside filter 1602A may also be configured to block external light (e.g., scene light or other light incident on the backside 1611) that would activate the darkening of the photochromic material of the dimming layer 1614. As further shown in FIG. 16, the backside filter 1602A is configured to pass the visible scene light 222.

In some embodiments, the backside filter 1602A is configured to be selectively switched between a first state and a second state. The first state may enable the backside filter 1602A to block the range of light wavelengths (received at the backside 1611) that would activate the darkening of the photochromic material of the dimming layer 1614, while passing the visible scene light 222. The second state may enable the backside filter 1602A to pass both the range of light wavelengths and the visible scene light 222. When in the second state, the backside filter 1602 may allow the darkening of the dimming layer 1614 across an entire field-of-view of the near-eye optical assembly 1600, such as may be desirable in bright light conditions. In this embodiment, the backside filter 1602A may include one or more of a switchable waveplate and at least one polarization layer.

FIG. 16, further illustrates the near-eye optical assembly 1600 as including an eyeward side filter 1602B that is disposed on the optical path of the near-eye optical assembly 1600 between the eyeward side 1609 and the dimming layer 1614. The eyeward side filter 1602B may be configured to absorb and/or reflect the activation light 1410 to prevent leakage of the activation light 1410 outside of the near-eye optical assembly 1600. The eyeward side filter 1602B may also be configured to block external light (e.g., scene light or other light incident on the eyeward side 1609) that would activate the darkening of the photochromic material of the dimming layer 1614. As further shown in FIG. 16, the eyeward side filter 1602B is configured to pass the visible scene light 222.

In some embodiments, the eyeward side filter 1602B is configured to pass the activation light 1410 to the dimming layer 1614 but to also block other light within the range of light wavelengths. For example, the eyeward side filter 1602B may be configured to pass UV light that is generated by the laser scanner 1408, but to block other UV light (e.g., from the environment) that would otherwise activate a darkening of the dimming layer 1614. In one example, the eyeward side filter 1602B may selectively allow the activation light 1410 to pass by being angularly selective. That is, the eyeward side filter 1602B may be configured to pass the activation light 1410 based on an angle of incidence of the activation light 1410 upon the eyeward side filter 1602B. In one example, this may be accomplished since the laser scanner 1408 is mounted to a temple arm (e.g., temple arm 1404 of FIG. 14) of the head-mounted device at a known location and at a known angle with respect to the near-eye optical assembly.

In some embodiments, the eyeward side filter 1602B includes a diffraction grating that is configured to pass the activation light 1410 and to block other light that is within the range of light wavelengths. In another embodiment, the eyeward side filter 1602B includes a dielectric mirror that is configured to pass the activation light 1410 and to block other light that is within the range of light wavelengths.

Figure 17:
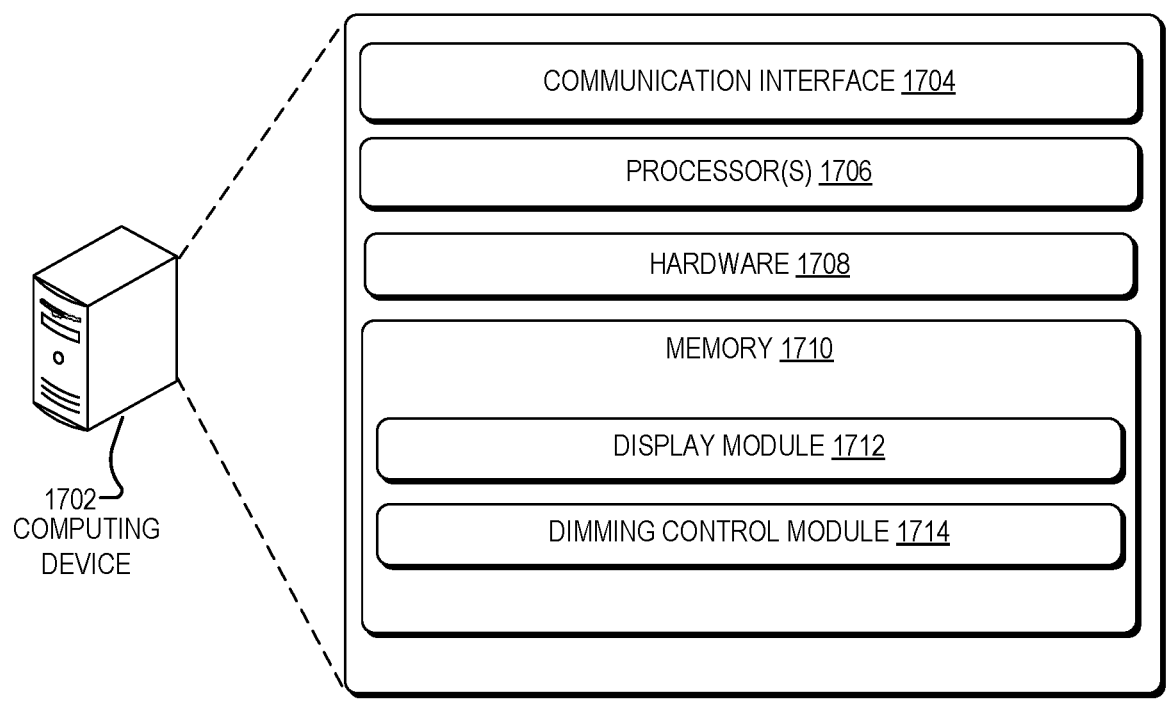
FIG. 17 illustrates an example computing device for the dynamic control of in-field dimmers, in accordance with aspects of the present disclosure.

FIG. 17 illustrates an example computing device 1702 for the dynamic control of in-field dimmers, in accordance with aspects of the present disclosure. The illustrated example of computing device 1702 is shown as including a communication interface 1704, one or more processors 1706, hardware 1708, and a memory 1710. In one example, one or more of the components illustrated in FIG. 17 may be incorporated into the frame 202 and/or temple arms 204A/204B of the head-mounted device 200 of FIG. 2. In another example, one or more of the components illustrated in FIG. 17 may be incorporated into the frame 1402 and/or temple arm 1404 of the head-mounted devices 1400A and 1400B of FIGS. 14A and 14B. In other examples, one or more of the components illustrated in FIG. 17 may be incorporated into a remote computing device that is communicatively coupled to the head-mounted device 200/1400 for performing one or more aspects of the dynamic control of the in-field dimmers.

The communication interface 1704 may include wireless and/or wired communication components that enable the computing device 1702 to transmit data to and receive data from other networked devices. The hardware 1708 may include additional hardware interface, data communication, or data storage hardware. For example, the hardware interfaces may include a data output device (e.g., electronic display, audio speakers), and one or more data input devices.

The memory 1710 may be implemented using computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 1706 and the memory 1710 of the computing device 1702 may implement a display module 1712 and a dimming control module 1714. The display module 1712 and the dimming control module 1714 may include routines, program instructions, objects, and/or data structures that perform particular tasks or implement particular abstract data types. The memory 1710 may also include a data store (not shown) that is used by the display module 1712 and/or dimming control module 1714.

The display module 1712 may be configured to determine that the visible scene light (e.g., visible scene light 222 of FIG. 2) in a region of the near-eye optical assembly will interfere with a visibility of a virtual graphic (e.g., virtual graphic 104 of FIG. 1) that is generated by the visible display light 224 located in the same region. In some implementations, the head-mounted device may include one or more light sensors that provide information about the visible scene light (e.g., brightness, contrast, color, etc.). In another implementation, the head-mounted device may include a camera that is positioned (e.g., on the temple arm 204B of FIG. 2) to obtain images of the field-of-view provided by the optical assembly. The display module 1712 may receive the images and/or data from the light sensor to determine whether the visible scene light is interfering with a visibility of the virtual graphic.

In some aspects, the display module 1712 determines the visibility of the virtual graphic based on readings obtained from the light sensors and/or by performing image processing on images of the field-of-view. This may include determining an ambient brightness and/or determining a contrast between the visible scene light and the virtual graphic. In another example, the display module 1712 may determine the visibility of the virtual graphic by comparing a color of the visible scene light in a region that corresponds to where the virtual graphic is to be displayed. If the visible scene light is too bright, the contrast between the scene light and the virtual graphic is too low, and/or if a color of the scene light is similar to that of the virtual graphic, then the display module 1712 then determines that the visible scene light will indeed interfere with the visibility of the virtual graphic.

In response to the determination by the display module 1712 that the visible scene light will interfere with the visibility of the virtual graphic, the dimming control module 1714 may then activate the darkening of one or more regions of the dimming layer of the near-eye optical assembly to dim and/or occlude the visible scene light. For example, with reference to head-mounted device 200 of FIG. 2, the dimming control module 1714 may enable in-field dimmer 218 to emit the activation light 226 to activate the darkening of region 220 in dimming layer 214. As discussed above, the darkening of region 220 may dim the visible scene light 222 within the region 220 to increase the visibility of the virtual graphic generated by display light 224.

By way of another example, and with reference to the head-mounted device 1400 of FIG. 14A, the dimming control module 1714 may control the digital projector 1408A to emit the activation light 1410A to activate the darkening of region 1412 to increase the visibility of a virtual graphic generated by a display layer of the near-eye optical assembly 1406 within the region 1412. The dimming control module 1714 may also be configured to control the laser scanner of the digital projector 1408A to raster scan the region 1412 to activate the darkening. In some embodiments, the dimming control module 1714 may be configured to control the digital projector 1408A to direct the activation light 1410A to darken a plurality of separate and distinct regions of the dimming layer.

Figure 18:
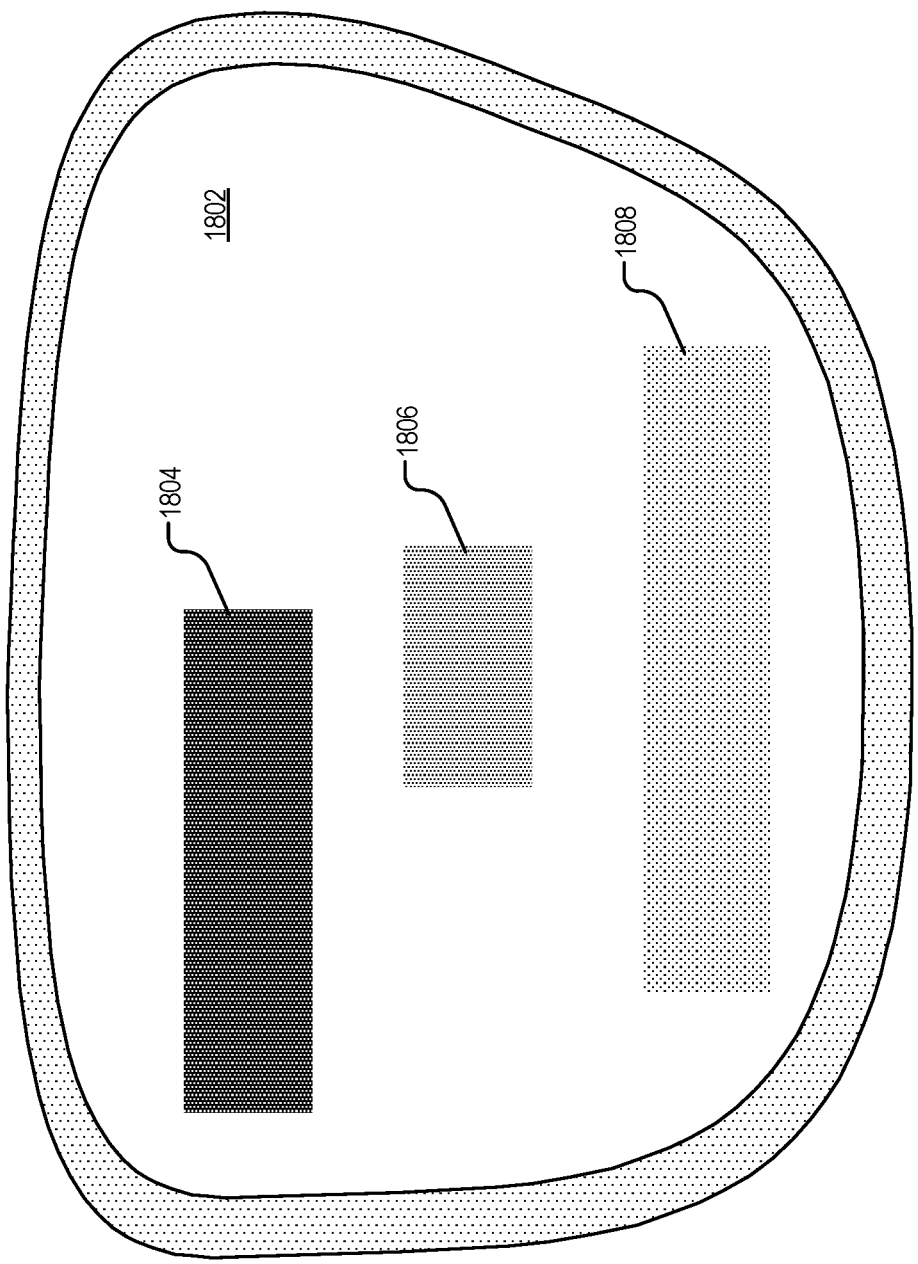
FIG. 18 illustrates a varying amount of darkening provided by a dimming layer of a near-eye optical assembly, in accordance with aspects of the present disclosure.

In some aspects, the dimming control module 1714 may be configured to vary an amount of darkening that is provided by a region of the dimming layer. For example, FIG. 18 illustrates a varying amount of darkening provided by a dimming layer of a near-eye optical assembly 1802, in accordance with aspects of the present disclosure. The near-eye optical assembly 1802 illustrates various amounts of darkening that may be provided by the near-eye optical assembly 206A of FIG. 2 and/or by the near-eye optical assembly 1406 of FIGS. 14A and 14B. For example, a first region 1804 is darkened by a first amount, a second region 1806 is darkened by a second amount, and a third region 1808 is darkened by a third amount. In some aspects, the amount to darken a particular region is determined based on the amount of dimming needed to make the virtual graphic sufficiently visible to the user. For example, in some implementations an upper region of the field-of-view may include a view of the sky which is generally brighter than a lower region of the field-of view which may include a view of the ground. Thus, regions in the upper half of the field-of-view may be darkened more than those is the lower half of the field-of-view. Even still, a bright spot within the field-of-view caused by external light sources (e.g., oncoming vehicle headlight, lamp, etc.) may need to be dimmed more as compared to the surrounding areas.

When incorporated into the head-mounted device 200 of FIG. 2 or the head-mounted device 1400B of FIG. 14B, varying the amount of darkening may include the dimming control module 1714 performing pulse-width modulation of the light source of the in-field dimmer 218 or the digital projector 1408A. For example, the dimming control module 1714 may adjust the frequency, ON time, and/or OFF time of the light source to increase or decrease the amount of darkening of the dimming layer.

When incorporated into the head-mounted device 1400A of FIG. 14A, varying the amount of darkening may include the dimming control module 1714 controlling the scanning speed and/or laser power of the laser scanner of the digital projector 1408A to increase or decrease the darkening of the dimming layer included in near-eye optical assembly 1406.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head-mounted device, comprising:
a frame;
a temple arm coupled to the frame;
a digital projector coupled to the temple arm; and
an optical assembly secured within the frame, wherein the optical assembly is configured to receive visible scene light at a backside of the optical assembly and to direct the visible scene light on an optical path toward an eyeward side of the optical assembly, wherein the optical assembly includes:
a dimming layer disposed on the optical path between the eyeward side and the backside, wherein the dimming layer includes a photochromic material that is configured to darken in response to exposure to a range of light wavelengths, and wherein the digital projector is configured to selectively emit an activation light within the range of light wavelengths to activate a darkening of a region of the dimming layer to dim visible scene light within the region.

2. The head-mounted device of claim 1, wherein the optical assembly further comprises:
a display layer disposed on the optical path between the dimming layer and the eyeward side of the optical assembly, wherein the display layer is configured to direct visible display light toward the eyeward side.

3. The head-mounted device of claim 1, wherein the activation light comprises non-visible light, ultraviolet light, infrared light, or violet light.

4. The head-mounted device of claim 1, wherein the optical assembly further comprises:
a backside filter disposed on the optical path between the backside of the optical assembly and the dimming layer, wherein the backside filter is configured to block the range of light wavelengths and to pass the visible scene light.

5. A device, comprising:
a display layer configured to direct visible display light toward an eyeward side of the device to present a virtual graphic, and wherein the display layer is configured to pass visible scene light received at a backside of the device;
a dimming layer disposed between the display layer and the backside, wherein the dimming layer includes a photochromic material that is configured to darken in response to exposure to a range of light wavelengths;
a laser scanner disposed on the eyeward side of the device; and
a computing device configured to control the laser scanner to emit an activation light within the range of light wavelengths to activate a darkening of a region in the dimming layer to dim the visible scene light in response to determining that the visible scene light will interfere with a visibility of the virtual graphic.

6. The device of claim 5, wherein the computing device is configured to determine that the visible scene light in the region will interfere with the visibility of the virtual graphic by determining a contrast between the visible scene light and the visible display light within the region or by comparing a color of the visible scene light with a color of the visible display light.

7. The device of claim 5, wherein the computing device is configured to control the laser scanner to vary an amount of the darkening of the region in the dimming layer.

8. The device of claim 5, wherein the computing device is configured to control the laser scanner to raster scan within the region of the dimming layer to activate the darkening.

9. The device of claim 5, wherein the computing device is configured to control the laser scanner to direct the activation light to darken a plurality of separate and distinct regions of the dimming layer.

10. A device, comprising:
a display layer configured to direct visible display light toward an eyeward side of the device to present a virtual graphic, and wherein the display layer is configured to pass visible scene light;
a dimming layer including a photochromic material that is configured to darken in response to exposure to a range of light wavelengths; and
a light source; and
a computing device configured to drive the light source to selectively emit an activation light within the range of light wavelengths to activate a darkening of a region in the dimming layer in response to determining that the visible scene light will interfere with a visibility of the virtual graphic, wherein the darkening of the region reduces a brightness of the visible scene light passing through the region.

11. The device of claim 10, wherein the computing device is configured to determine that the visible scene light in the region will interfere with the visibility of the virtual graphic by determining a contrast between the visible scene light and the visible display light within the region.

12. The device of claim 10, wherein the computing device is configured to control the light source to vary an amount of the darkening of the region in the dimming layer.

13. The device of claim 10, wherein the computing device is configured to control the light source to raster scan within the region of the dimming layer to activate the darkening.

14. The device of claim 10, wherein the computing device is configured to control the light source to direct the activation light to darken a plurality of separate and distinct regions of the dimming layer.

15. The device of claim 10, wherein the computing device is configured to determine that the visible scene light in the region will interfere with the visibility of the virtual graphic by comparing a color of the visible scene light with a color of the visible display light.

16. The device of claim 10, wherein the device further comprises:
an eyeward side filter configured to:
pass the activation light to the dimming layer;
block other light within the range of light wavelengths; and
pass the visible scene light.

17. The device of claim 16, wherein the eyeward side filter is configured to pass the activation light based on an angle of incidence of the activation light upon the eyeward side filter.

18. The device of claim 16, wherein the eyeward side filter comprises a diffraction grating configured to pass the activation light and to block the other light within the range of light wavelengths.

19. The device of claim 16, wherein the eyeward side filter comprises a dielectric mirror configured to pass the activation light and to block the other light within the range of light wavelengths.

20. The device of claim 10, wherein the light source includes a laser.

* * * * *